US012789094B2

(12) United States Patent
Sato et al.

(10) Patent No.: US 12,789,094 B2
(45) Date of Patent: Nov. 10, 2026

(54) COMPUTER-READABLE MEDIA, INFORMATION PROCESSING SYSTEM, INFORMATION PROCESSING APPARATUS, AND INFORMATION PROCESSING METHOD

(71) Applicant: Nintendo Co., Ltd., Kyoto (JP)

(72) Inventors: Katsuhisa Sato, Kyoto (JP); Haruki Sato, Kyoto (JP); Naoki Fukada, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 383 days.

(21) Appl. No.: 18/517,927

(22) Filed: Nov. 22, 2023

(65) Prior Publication Data

US 2024/0350921 A1 Oct. 24, 2024

(30) Foreign Application Priority Data

Apr. 21, 2023 (JP) ................................ 2023-070334
Apr. 21, 2023 (JP) ................................ 2023-070335

(51) Int. Cl.
*A63F 13/56* (2014.01)
*A63F 13/577* (2014.01)

(52) U.S. Cl.
CPC ............ *A63F 13/56* (2014.09); *A63F 13/577* (2014.09); *A63F 2300/64* (2013.01)

(58) Field of Classification Search
CPC .... A63F 13/56; A63F 13/577; A63F 2300/64; A63F 2300/643
USPC .......................................................... 463/31
See application file for complete search history.

(56) References Cited

U.S. PATENT DOCUMENTS 5,899,810 A 5/1999 Smith
6,835,137 B1 12/2004 Nakamura
6,908,388 B2 * 6/2005 Shimizu .................. A63F 13/10 463/31
12,267,566 B2 4/2025 Huske et al.
2008/0096654 A1 * 4/2008 Mondesir .............. A63F 13/213 463/31
2008/0125224 A1 * 5/2008 Pollatsek .............. A63F 13/428 463/43

(Continued)

FOREIGN PATENT DOCUMENTS

JP 2000-051518 2/2000
JP 2001-000743 1/2001
JP 2020-048832 4/2020

OTHER PUBLICATIONS

"How to Use Vehicles" dated Oct. 27, 2019; https://www.ign.com/wikis/call-of-duty-modern-warfare/How_to_Use_Vehicles (Year . 2019).*

(Continued)

*Primary Examiner* — Allen Chan
(74) *Attorney, Agent, or Firm* — Nixon & Vanderhye PC

(57) ABSTRACT

In an example of a game according to an exemplary embodiment, a movement of a movable dynamic object placed in a virtual space is controlled based on physical calculations, a movement of a player character is controlled based on an operation input, and if the player character and the dynamic object are in contact with each other in a down direction of the player character, the movement of the dynamic object in contact with the player character in the down direction is added to the movement of the player character.

28 Claims, 15 Drawing Sheets

(56) References Cited

U.S. PATENT DOCUMENTS

| | | | | |
|---|---|---|---|---|
| 2012/0302338 | A1* | 11/2012 | Shikata | A63F 13/2145 463/31 |
| 2021/0178273 | A1 | 6/2021 | Wu et al. | |

OTHER PUBLICATIONS

"Dual Fighter Trophy in Arcade Game Series: Galaga" dated Apr. 24, 2016; https://www.playstationtrophies.org/game/galaga/ trophy/138500-dual-fighter.html; associated Youtube video: https://www.youtube.com/watch?v=HLH07O3Xfqk (Year: 2016).*
"The Legend of Zelda: Breath of the Wild", [online], Year 2022, Nintendo of America, [searched on Apr. 13, 2023], internet URL: https://www.zelda.com/breath-of-the-wild/, 4 pages.
Fukada et al., U.S. Appl. No. 18/517,976, filed Nov. 22, 2023.
Mar. 22, 2024 Office Action issued in Japanese Patent Application No. 2023-070334, pp. 1-3 [machine translation included].
Kenichiro Matsuura, "Action Game Algorithm Maniax", first edition, SB Creative Corp., May 30, 2007, pp. 1-5.

* cited by examiner

<CASE 1> 310 AND 311 ARE CONNECTED.

<CASE 2> 310 AND 311 ARE CONNECTED.

<CASE 3> 310 AND 311 ARE NOT CONNECTED

<CASE 4> 311 AND 312 ARE CONNECTED. 310 IS NOT CONNECTED.

<CASE 5> 310 AND 311 ARE CONNECTED. 312 IS NOT CONNECTED.

<CASE 6> 310 AND 311 ARE CONNECTED. 312 IS NOT CONNECTED.

<CASE 7> NONE OF 310, 311, AND 312 IS CONNECTED.

COMPUTER-READABLE MEDIA, INFORMATION PROCESSING SYSTEM, INFORMATION PROCESSING APPARATUS, AND INFORMATION PROCESSING METHOD

CROSS REFERENCE TO RELATED APPLICATION

This application claims priority to Japanese Patent Application No. 2023-070334 and Japanese Patent Application No. 2023-070335 filed on Apr. 21, 2023, the entire contents of which are incorporated herein by reference.

FIELD

An exemplary embodiment relates to a non-transitory computer-readable storage medium having stored therein a game program, an information processing system, an information processing apparatus, and an information processing method.

BACKGROUND AND SUMMARY

Conventionally, there is a game where a player character moves while mounting a predetermined object.

However, there is room for improvement in moving a player character with the player character mounting various objects.

Therefore, it is an object of an exemplary embodiment to provide a game program, an information processing system, an information processing apparatus, and an information processing method that are suitable for moving a player character with the player character mounting various objects.

To achieve the above object, the exemplary embodiment employs the following configurations.

(First Configuration)

Instructions according to a first configuration, when executed, cause one or more processors of an information processing apparatus to execute game processing including: based on physical calculations, controlling a movement of a movable dynamic object placed in a virtual space; and based on an operation input, controlling a movement of a player character in the virtual space. The game processing includes: making a contact determination regarding a down direction of the player character; and if the player character is in contact with the dynamic object in the down direction, adding the movement of the dynamic object in contact with the player character in the down direction to the movement of the player character.

Based on the above, if a player character is on and in contact with a dynamic object on the premise that the dynamic object is moved in a virtual space based on physical calculations, the movement of the dynamic object is added to the movement of the player character. Consequently, if the player character is on and in contact with the dynamic object, it is possible to move the player character with the dynamic object without the position of the player character on the dynamic object being shifted. Further, it is possible to move the player character on the dynamic object.

(Second Configuration)

According to a second configuration, in the above first configuration, the game processing may further include forming an assembly object by linking a plurality of the dynamic objects based on an operation input.

Based on the above, it is possible to form an assembly object by linking a plurality of dynamic objects.

(Third Configuration)

According to a third configuration, in the second configuration, the dynamic object may include a propulsive object that has an operating state and a non-operating state and generates a propulsive force in the operating state. The game processing may further include, if the assembly object includes the propulsive object in the operating state, controlling a movement of the assembly object based on the propulsive force.

Based on the above, it is possible to move the assembly object based on a propulsive object that generates a propulsive force.

(Fourth Configuration)

According to a fourth configuration, in the above second or third configuration, the dynamic object may include a special behavior object that has a first state and a second state and makes a predetermined motion in accordance with a change from the first state to the second state. The game processing may further include, if the assembly object includes the special behavior object, during a predetermined period when the special behavior object is making the predetermined motion, not performing a process of adding the movement of the dynamic object included in the assembly object and in contact with the player character in the down direction to the movement of the player character, and performing a process of adding a second movement of the player character calculated based on physical calculations associated with contact between the dynamic object in contact with the player character in the down direction and the player character to the movement of the player character.

Based on the above, during a predetermined period when a special behavior object is making a predetermined motion, it is possible to determine the behavior of the player character based on physical calculations without performing the process of adding the movement of the dynamic object to the player character. Consequently, it is possible to move the player character staying close to the dynamic object, while releasing the movement in the middle and causing the player character to perform another behavior such as moving at a distance from the dynamic object.

(Fifth Configuration)

According to a fifth configuration, in the above first to fourth configurations, the dynamic object may include a special behavior object that has a first state and a second state and makes a predetermined motion in accordance with a change from the first state to the second state. The game processing may further include, if the dynamic object in contact with the player character in the down direction is the special behavior object, during a predetermined period when the special behavior object is making the predetermined motion, not performing a process of adding the movement of the dynamic object in contact with the player character in the down direction to the movement of the player character, and performing a process of adding a second movement of the player character calculated based on physical calculations associated with contact between the dynamic object in contact with the player character in the down direction and the player character to the movement of the player character.

Based on the above, it is possible to move the player character staying close to the dynamic object, while releasing the movement in the middle and causing the player character to perform another behavior such as moving at a distance from the dynamic object.

(Sixth Configuration)

According to a sixth configuration, in the above second to fourth configurations, the game processing may further include: based on an operation input, causing the player character to perform an object operation action at least including a first operation of moving a specified dynamic object and a second operation of forming an assembly object by linking the specified dynamic object to the other dynamic object; and if the assembly object including the dynamic object specified based on the object operation action includes the dynamic object in contact with the player character in the down direction, controlling the dynamic object not to move based on the first operation.

Based on the above, if the player character is on and in contact with the dynamic object included in an assembly object, it is possible to prevent the assembly object from moving based on an object operation action. Consequently, for example, it is possible to prevent an assembly object that the player character is mounting from continuing to move based on the object operation action.

(Seventh Configuration)

According to a seventh configuration, in the above sixth configuration, the game processing may further include, if the dynamic object in contact with the player character in the down direction is mounting the dynamic object specified based on the object operation action or the assembly object including the dynamic object specified based on the object operation action, controlling the dynamic object not to move based on the first operation.

Based on the above, if a dynamic object that the player character is mounting is further in contact with another dynamic object or an assembly object below the dynamic object, it is not possible to move the other dynamic object or the assembly object based on the object operation action by specifying the other dynamic object or the assembly object. Consequently, it is possible to prevent a dynamic object or an assembly object that the player character PC is indirectly mounting from moving based on the object operation action.

(Eighth Configuration)

According to an eighth configuration, in any of the first to seventh configurations, the game processing may further include performing a process of moving the player character based on physical calculations associated with contact between the dynamic object and the player character, and if the player character and the dynamic object are in contact with each other in the down direction, not moving the player character based on the physical calculations associated with the contact between the dynamic object and the player character in contact with each other in the down direction, and applying the same movement as the movement of the dynamic object in contact with the player character in the down direction to the player character, thereby moving the player character.

Based on the above, if the dynamic object is below and in contact with the player character on the premise that the movement of the player character is controlled based on physical calculations associated with contact between the player character and the dynamic object, the movement of the dynamic object in contact with the player character is applied to the player character without making physical calculations. Consequently, it is possible to move the player character with the dynamic object in contact with the player character in the down direction. If another dynamic object comes into contact with the player character from a different direction, it is possible to determine the behavior of the player character based on physical calculations.

Another configuration may be an information processing system, or may be an information processing apparatus, or may be an information processing method.

According to the exemplary embodiment, if a player character is on and in contact with a dynamic object, it is possible to move the player character with the dynamic object without the position of the player character on the dynamic object being shifted.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS (Game System Configuration)

Figure 1:
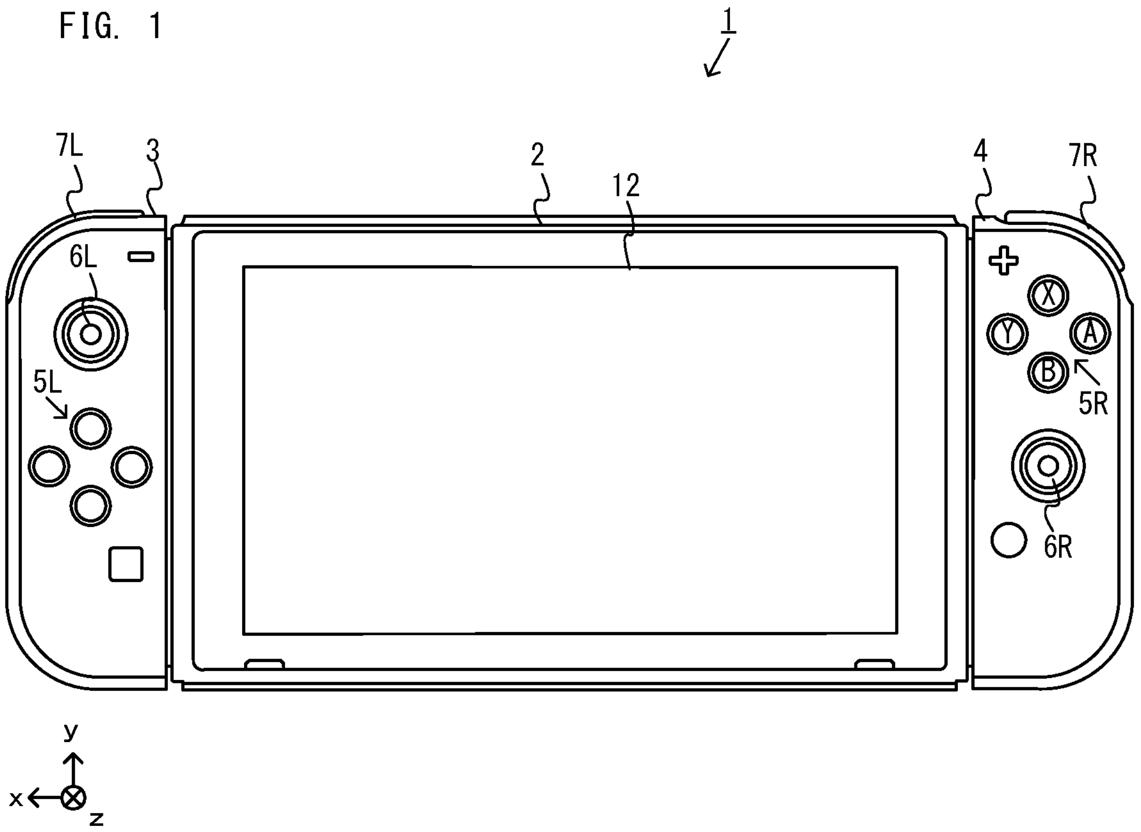
FIG. 1 is an example non-limiting diagram showing a game system.

A game system according to an example of an exemplary embodiment is described below. FIG. 1 is a diagram showing an exemplary game system. An example of a game system 1 according to the exemplary embodiment includes a main body apparatus (an information processing apparatus; which functions as a game apparatus main body in the exemplary embodiment) 2, a left controller 3, and a right controller 4. The main body apparatus 2 is an apparatus for performing various processes (e.g., game processing) in the game system 1. The left controller 3 includes a plurality of buttons 5L (up, down, left, and right direction keys) and an analog stick 6L as exemplary operation units through which a user provides input. The right controller 4 includes a plurality of buttons 5R (an A-button, a B-button, an X-button, and a Y-button) and an analog stick 6R as exemplary operation units through which the user provides input. An L-button 7L is provided on an upper surface of the left controller 3, and an R-button 7R is provided on an upper surface of the right controller 4.

Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2, or the main body apparatus 2, the left controller 3, and the right controller 4 may be separated from one another, when being used. It should be noted that hereinafter, the left controller 3 and the right controller 4 will occasionally be referred to collectively as a "controller".

Figure 2:
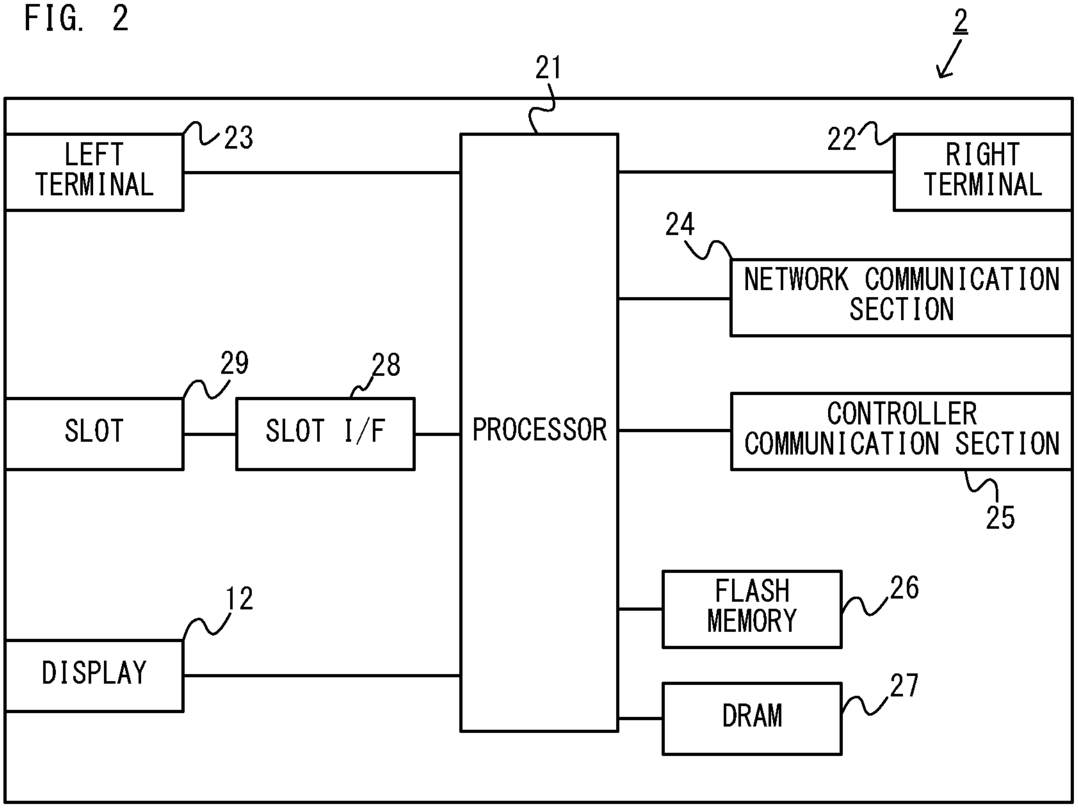
FIG. 2 is an example non-limiting block diagram showing an exemplary internal configuration of the main body apparatus 2.

FIG. 2 is a block diagram showing an example of the internal configuration of the main body apparatus 2. As shown in FIG. 2, the main body apparatus 2 includes a processor 21. The processor 21 is an information processing section for executing various types of information processing (e.g., game processing) to be executed by the main body apparatus 2, and for example, includes a CPU (Central Processing Unit) and a GPU (Graphics Processing Unit). Note that the processor 21 may be configured only by a CPU, or may be configured by a SoC (System-on-a-Chip) that includes a plurality of functions such as a CPU function and a GPU function. The processor 21 executes an information processing program (e.g., a game program) stored in a storage section (specifically, an internal storage medium such as a flash memory 26, an external storage medium attached to the slot 29, or the like), thereby performing the various types of information processing.

Further, the main body apparatus 2 also includes a display 12. The display 12 displays an image generated by the main body apparatus 2. In the exemplary embodiment, the display 12 is a liquid crystal display device (LCD). The display 12, however, may be a display device of any type. The display 12 is connected to the processor 21. The processor 21 displays a generated image (e.g., an image generated by executing the above information processing) and/or an externally acquired image on the display 12.

Further, the main body apparatus 2 includes a left terminal 23, which is a terminal for the main body apparatus 2 to perform wired communication with the left controller 3, and a right terminal 22, which is a terminal for the main body apparatus 2 to perform wired communication with the right controller 4.

Further, the main body apparatus 2 includes a flash memory 26 and a DRAM (Dynamic Random Access Memory) 27 as examples of internal storage media built into the main body apparatus 2. The flash memory 26 and the DRAM 27 are connected to the processor 21. The flash memory 26 is a memory mainly used to store various data (or programs) to be saved in the main body apparatus 2. The DRAM 27 is a memory used to temporarily store various data used for information processing.

The main body apparatus 2 includes a slot 29. The slot 29 is so shaped as to allow a predetermined type of storage medium to be attached to the slot 29. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of a game application or the like) used by the main body apparatus 2 and/or a program (e.g., a game program or the like) executed by the main body apparatus 2.

The main body apparatus 2 includes a slot interface (hereinafter abbreviated as "I/F") 28. The slot I/F 28 is connected to the processor 21. The slot I/F 28 is connected to the slot 29, and in accordance with an instruction from the processor 21, reads and writes data from and to the predetermined type of storage medium (e.g., a dedicated memory card) attached to the slot 29.

The processor 21 appropriately reads and writes data from and to the flash memory 26, the DRAM 27, and each of the above storage media, thereby performing the above information processing.

The main body apparatus 2 includes a network communication section 24. The network communication section 24 is connected to the processor 21. The network communication section 24 performs wired or wireless communication with an external apparatus via a network. In the exemplary embodiment, as a first communication form, the network communication section 24 connects to a wireless LAN and communicates with an external apparatus, using a method compliant with the Wi-Fi standard. Further, as a second communication form, the network communication section 24 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 25. The controller communication section 25 is connected to the processor 21. The controller communication section 25 wirelessly communicates with the left controller 3 and/or the right controller 4. The communication method between the main body apparatus 2 and the left controller 3 and the right controller 4 is optional. In the exemplary embodiment, the controller communication section 25 performs communication compliant with the Bluetooth (registered trademark) standard with the left controller 3 and with the right controller 4.

The processor 21 is connected to the left terminal 23 and the right terminal 22. When performing wired communication with the left controller 3, the processor 21 transmits data to the left controller 3 via the left terminal 23 and also receives operation data from the left controller 3 via the left terminal 23. Further, when performing wired communication with the right controller 4, the processor 21 transmits data to the right controller 4 via the right terminal 22 and also receives operation data from the right controller 4 via the right terminal 22. As described above, in the exemplary embodiment, the main body apparatus 2 can perform both wired communication and wireless communication with each of the left controller 3 and the right controller 4.

It should be noted that, in addition to the elements shown in FIG. 2, the main body apparatus 2 includes a battery that supplies power and an output terminal for outputting images and audio to a display device (e.g., a television) separate from the display 12.

(Overview of Game)

Next, a game according to the exemplary embodiment is described. In the game according to the exemplary embodiment, a player character PC controlled based on an operation input provided by a player is placed in a three-dimensional virtual space (a game space).

Figure 3:
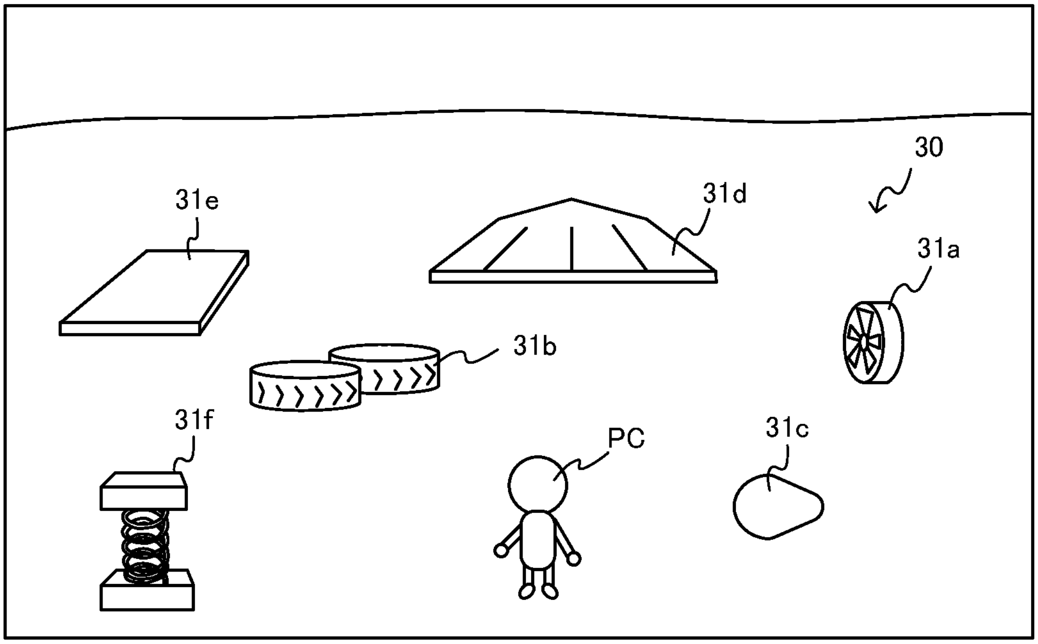
FIG. 3 is an example non-limiting diagram showing an example of a game image displayed in a case where a game according to an exemplary embodiment is executed.

FIG. 3 is a diagram showing an example of a game image displayed in a case where the game according to the exemplary embodiment is executed. As shown in FIG. 3, the player character PC and a plurality of dynamic objects 31 (e.g., 31*a* to 31*f*) are placed on a ground 30 in the virtual space. The dynamic objects 31 are objects capable of moving in the virtual space. As described below, the dynamic objects 31 include an object that generates a force itself and performs an action, and an object that does not generate a force itself, but receives a force from another object or gravity and performs an action. Although not shown in FIG. 3, non-player characters (e.g., an enemy character, a company character of the player character PC, and the like) controlled by the processor 21 are placed in addition to the player character PC in the virtual space.

At least any one of the plurality of dynamic objects 31 may be placed in advance in the virtual space. At least any one of the plurality of dynamic objects 31 may be placed in the virtual space in accordance with an operation input provided by the player. If the player character PC defeats an enemy character, at least any one of the plurality of dynamic objects 31 may be placed in the virtual space.

Based on an operation input provided to the controller (3 or 4), the player character PC moves in the virtual space or performs any of a plurality of actions in the virtual space.

For example, based on a direction operation input to the analog stick 6L of the controller 3, the player character PC moves at a predetermined velocity on the ground 30 in the virtual space. The velocity at which the player character PC moves on the ground 30 may change in accordance with the tilt angle of the analog stick 6L. The velocity at which the player character PC moves on the ground 30 may change in accordance with the friction between the player character PC and the ground 30 and the tilt of the ground 30.

The player character PC performs an attack action as one of the plurality of actions. Specifically, the player character PC is equipped with a weapon object owned by the player character PC, and based on an operation input provided by the player, performs an attack action relating to the weapon object with which the player character PC is equipped.

The player character PC also performs an object operation action as one of the plurality of actions. For example, the object operation action is the action of remotely operating a dynamic object 31 in front of the player character PC. The dynamic object 31 is an object that can be a target of the object operation action of the player character PC. The player character PC operates the dynamic object 31 based on the object operation action.

Specifically, based on an operation input provided by the player, any of the plurality of dynamic objects placed in the virtual space is set as a control target of the object operation action. Based on the object operation action, the control target is moved in the virtual space. Based on the object operation action, the orientation of the control target is also controlled. Based on the object operation action, the control target is also connected (linked) to another dynamic object placed in the virtual space and integrated with the other dynamic object. Consequently, an assembly object obtained by combining a plurality of dynamic objects is generated. An operation on each dynamic object 31 based on the object operation action will be described below.

Each dynamic object 31 may be able to move in the virtual space based not only on the object operation action, but also on another action (e.g., the action of lifting the object) of the player character PC. Such another action may be able to move the dynamic object 31, but may be prevented from integrating the dynamic object with another dynamic object as in the object operation action.

In the virtual space, a static object that does not move based on the action of the player character PC or a force from another object is also placed. Examples of the static object include terrain objects such as a rock, a mountain, a building, and a ground fixed to the virtual space. The static object is an object that cannot be operated based on the object operation action.

As shown in FIG. 3, the plurality of dynamic objects 31 include, for example, a fan object 31*a*, a wheel object 31*b*, a first special object 31*c*, a wing object 31*d*, a board object 31*e*, and a second special object 31*f*.

The fan object 31*a* is an object representing a fan. The fan object 31*a* has a non-operating state and an operating state, can generate a wind in the virtual space when in the operating state, and can fly an object (e.g., an enemy character) placed in the virtual space by the force of the wind. The fan object 31*a* also generates a propulsive force in a direction opposite to the direction of the wind.

The wheel object 31*b* is an object representing a wheel. The wheel object 31*b* has a non-operating state and an operating state, rotates in a direction set in advance when in the operating state, and generates a propulsive force by the rotation.

The first special object 31*c* has a non-operating state and an operating state. If the first special object 31*c* enters the operating state, the first special object 31*c* performs a predetermined behavior of changing from a first orientation to a second orientation. In the non-operating state, the first special object 31*c* is in the first orientation based on the shape and the position of the center of gravity of the first special object 31*c*. However, when the first special object 31*c* enters the operating state, the first special object 31*c* generates a force to change to the second orientation. The details of the first special object 31*c* will be described below.

The wing object 31*d* is an object for flying in the sky. In a case where the wing object 31*d* moves at a predetermined velocity or more in the virtual space, the wing object 31*d* generates an upward force in the virtual space.

The board object 31*e* is a planar object, and for example, can be used as the body of a vehicle.

The second special object 31*f* is, for example, an object representing a spring. The second special object 31*f* has a non-operating state and an operating state. If the second special object 31*f* is in the operating state, the second special object 31*f* performs a predetermined behavior of changing from a contracted state to an expanded state. While the second special object 31*f* is performing the predetermined behavior, the second special object 31*f* can swiftly fly an object mounting the second special object 31*f* into the virtual space. The details of the second special object 31*f* will be described below.

Each of the fan object 31*a* and the wheel object 31*b* is a dynamic object that, if the dynamic object is in the operating state, generates a propulsive force itself, and can move in the virtual space by the propulsive force. Each of the first special object 31*c* and the second special object 31*f* is a dynamic object that, if the dynamic object is in the operating state, performs a predetermined behavior in the virtual space by a force generated by the dynamic object itself. On the other hand, each of the wing object 31*d* and the board object 31*e* is an object that does not have a non-operating state and an operating state, and does not generate a propulsive force itself or perform a predetermined behavior by a force generated by the object itself. For example, if the wing object 31*d* moves at a predetermined velocity or more in the virtual space by another object applying a force to the wing object 31*d*, the wing object 31*d* generates a lift force, but cannot move by the force of the wing object 31*d* itself. The board object 31*e* can move in the virtual space by another object applying a force to the board object 31*e*, but cannot move by the force of the board object 31*e* itself.

In addition to the dynamic objects 31 shown in FIG. 3, various other dynamic objects 31 are prepared. For example, as a dynamic object 31, a rocket object may be prepared that temporarily generates a great propulsive force if the rocket object is in an operating state.

(Operation on Dynamic Object Based on Object Operation Action)

As described above, in the game according to the exemplary embodiment, it is possible to move a dynamic object 31 based on the object operation action of the player character PC. It is also possible to generate an assembly object by linking a plurality of dynamic objects 31 based on the object operation action.

Figure 4:
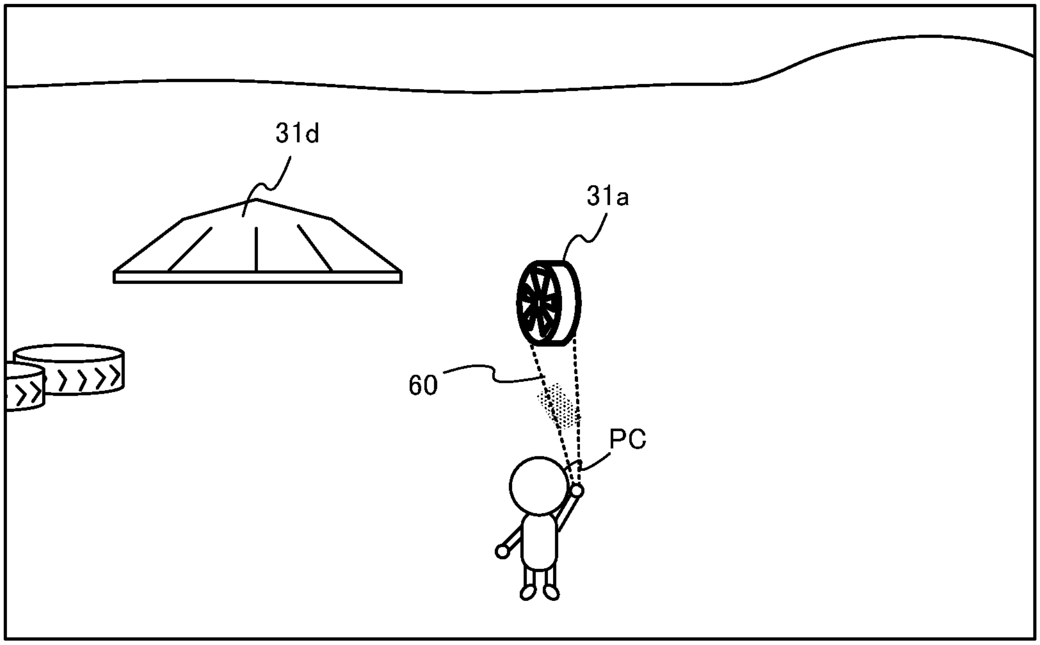
FIG. 4 is an example non-limiting diagram showing an example of a game image displayed when a dynamic object 31 is being operated based on an object operation action of a player character PC.

FIG. 4 is a diagram showing an example of a game image displayed when a dynamic object 31 is being operated based on the object operation action of the player character PC.

For example, when a dynamic object 31 is in front of the player character PC (or near the fixation point of a virtual camera), and if a predetermined operation input is provided, the player character PC performs the object operation action on the dynamic object 31. For example, in accordance with a predetermined selection operation, the fan object 31*a* is selected among the plurality of dynamic objects 31 placed in the virtual space. Then, if a predetermined operation input is provided, as shown in FIG. 4, the selected fan object 31*a* becomes a control target, and the game enters the state where the object operation action is being performed on the control target. In the state where the object operation action is being performed on the fan object 31*a*, the fan object 31*a* is in the state where the fan object 31*a* is off the ground, and is also in a display form different from normal. An effect image 60 indicating that the object operation action is being performed is also displayed.

At this time, if the player character PC moves in accordance with a movement operation input (e.g., a direction operation input to the analog stick 6L of the left controller 3) provided by the player, the fan object 31*a* also moves. For example, if a direction operation input is provided to the analog stick 6R of the right controller 4, the direction of the player character PC may change, and the fan object 31*a* may also move in the virtual space so that the fan object 31*a* is located in front of the player character PC. For example, the fan object 31*a* may be moved without the movement of the player character PC or rotated in accordance with key operations on the buttons 5L without a change in the direction the player character PC.

Figure 5:
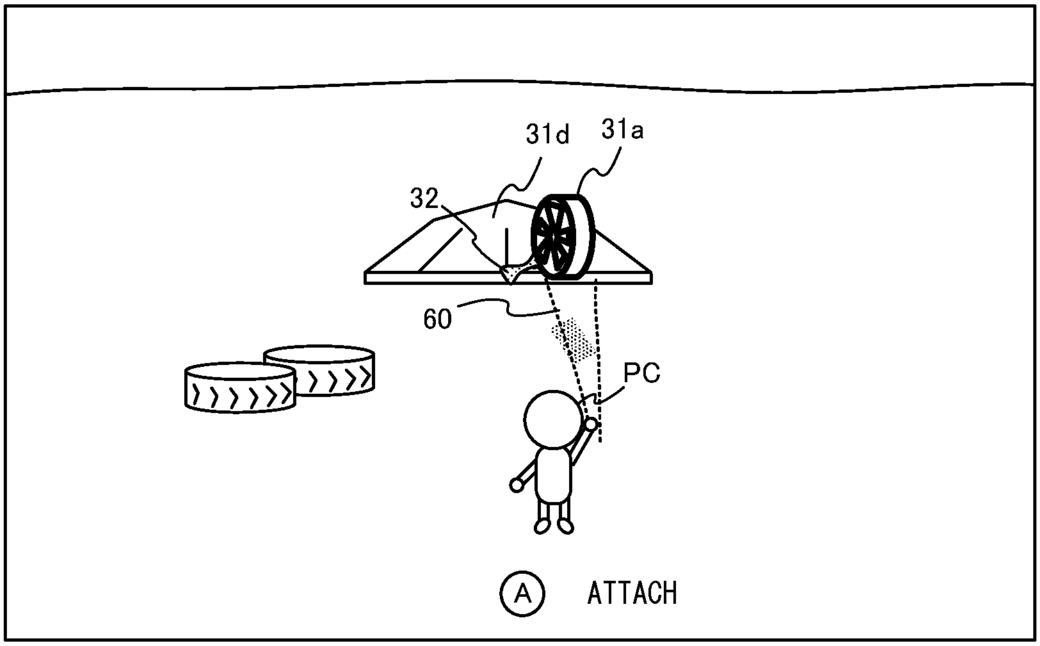
FIG. 5 is an example non-limiting diagram showing an example of a game image displayed when a fan object 31*a* is being moved based on the object operation action.

FIG. 5 is a diagram showing an example of a game image displayed when the fan object 31*a* is being moved based on the object operation action. As shown in FIG. 5, for example, while the fan object 31*a* is being operated based on the object operation action, and if the player character PC moves toward the wing object 31*d*, the fan object 31*a* also moves in the same direction by following the player character PC. Alternatively, while the fan object 31*a* is being operated based on the object operation action, the fan object 31*a* may move toward the wing object 31*d* in accordance with key operations on the buttons 5L. In a case where the fan object 31*a* and the wing object 31*d* satisfy a predetermined connection condition (e.g., the distance between the fan object 31*a* and the wing object 31*d* is less than a threshold), a connection object 32 suggesting a connection position is displayed (FIG. 5). When the connection object 32 is displayed, and if a connection instruction (e.g., the pressing of the A-button) is given by the player, the fan object 31*a* is connected (linked) to the wing object 31*d*. Consequently, an assembly object including a plurality of dynamic objects 31 is generated. Here, as the assembly object, an airplane object 40 including the fan object 31*a* and the wing object 31*d* is generated.

Figure 6:
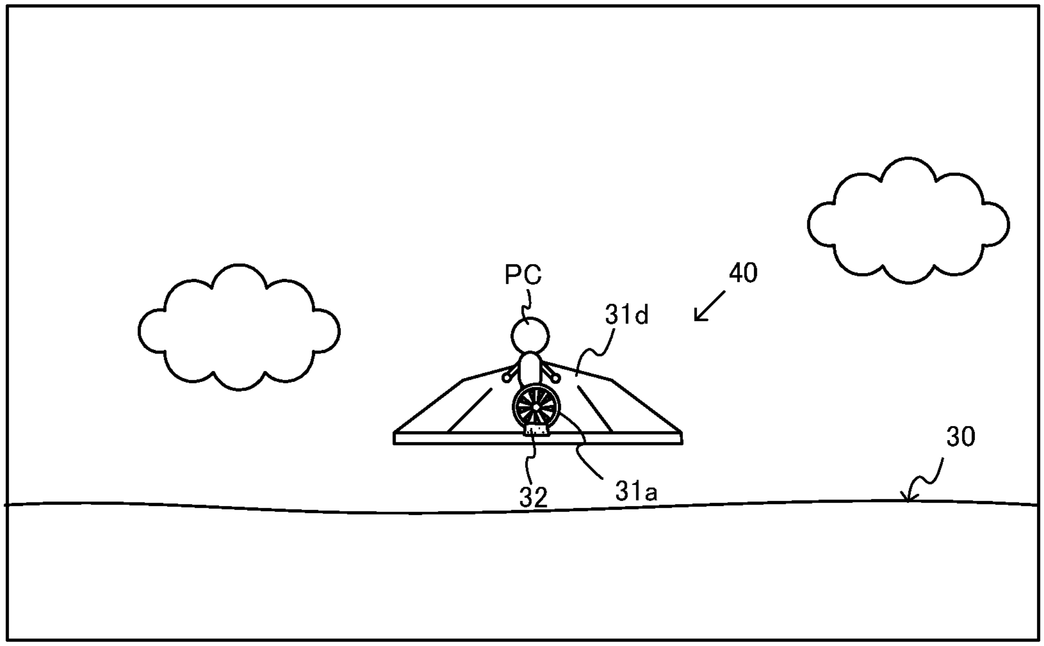
FIG. 6 is an example non-limiting diagram showing an example of an assembly object generated based on the object operation action and an example of an airplane object 40 including the fan object 31*a* and a wing object 31*d:*

FIG. 6 is a diagram showing an example of the assembly object generated based on the object operation action and an example of the airplane object 40 including the fan object 31*a* and the wing object 31*d*.

As shown in FIG. 6, a connection object 32 is placed between the fan object 31*a* and the wing object 31*d*. The connection object 32 is an object indicating that the dynamic objects 31 are connected together and the connection position of the dynamic objects 31, and is an object that fixes the positional relationship between the dynamic objects 31. The plurality of dynamic objects 31 included in the assembly object are connected together by connection objects 32.

The assembly object including the plurality of dynamic objects 31 performs an action in a unified manner in the virtual space. For example, if the fan object 31*a* included in the airplane object 40 changes from the non-operating state to the operating state, the fan object 31*a* generates a propulsive force. This propulsive force of the fan object 31*a* is also transmitted via the connection object 32 to the wing object 31*d* connected to the fan object 31*a*, and the airplane object 40 including the fan object 31*a* and the wing object 31*d* starts moving.

After the airplane object 40 starts moving, and if the velocity of the airplane object 40 exceeds a predetermined value, the airplane object 40 floats in the air by the lift of the wing object 31*d* and flies in the virtual space. The player character PC can fly in the virtual space on the airplane object 40.

Figure 7:
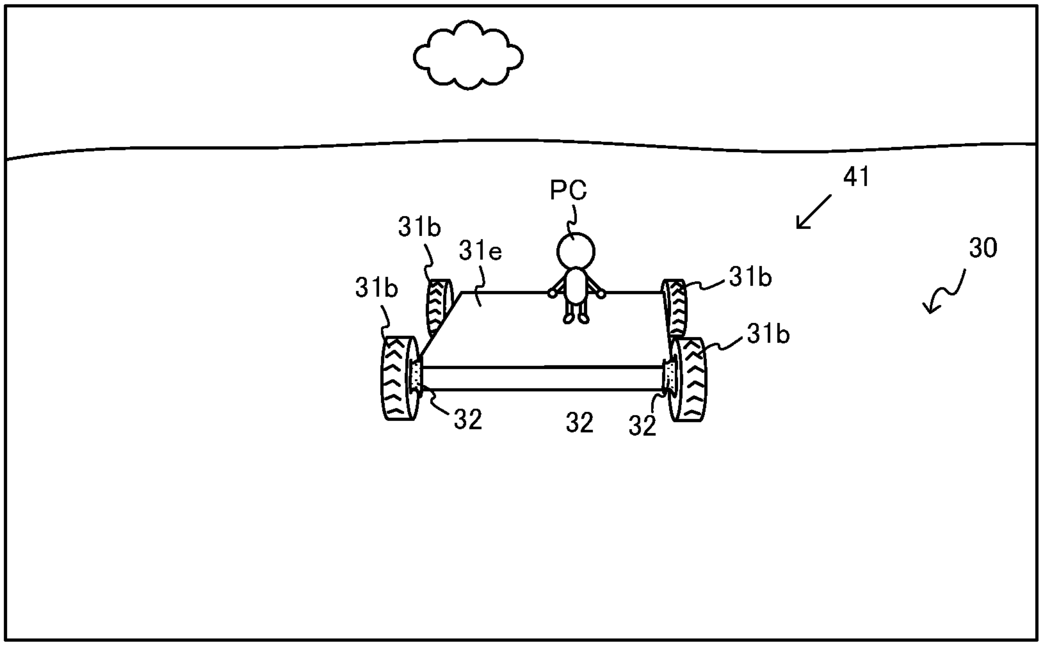
FIG. 7 is an example non-limiting diagram showing an example of another assembly object generated based on the object operation action and an example of a four-wheel vehicle object 41.

FIG. 7 is a diagram showing an example of another assembly object generated based on the object operation action and an example of a four-wheel vehicle object 41.

As shown in FIG. 7, the four-wheel vehicle object 41 includes the board object 31*e* and four wheel objects 31*b*. For example, based on the object operation action, the four wheel objects 31*b* are connected to side surfaces of the board object 31*e* in order. Each of the four wheel objects 31*b* and the board object 31*e* are connected by a connection object 32. Consequently, the four-wheel vehicle object 41 as an assembly object that performs an action in a unified manner is generated.

If the wheel objects 31*b* are in the operating state, each of the wheel objects 31*b* rotates in a direction set in advance. The four wheel objects 31*b* are connected to the board object 31*e* so that the four wheel objects 31*b* rotate in the same direction. In this case, if the four wheel objects 31*b* enter the operating state, each of the four wheel objects 31*b* generates a propulsive force in the same direction, and the four-wheel vehicle object 41 starts moving on the ground in the virtual space. The player character PC on the four-wheel vehicle object 41 can move faster than walking on the ground in the virtual space.

(In Case where Player Character Moves while Mounting Dynamic Object)

Next, a description is given of control when the player character PC moves while mounting a dynamic object.

In the game according to the exemplary embodiment, if the player character PC is mounting a dynamic object, the dynamic object can enter an adsorption state. If the dynamic object that the player character PC is mounting is in the adsorption state, the player character PC moves with the dynamic object as if the player character PC were adsorbed to the dynamic object. The adsorption state is described in detail below.

Figure 8:
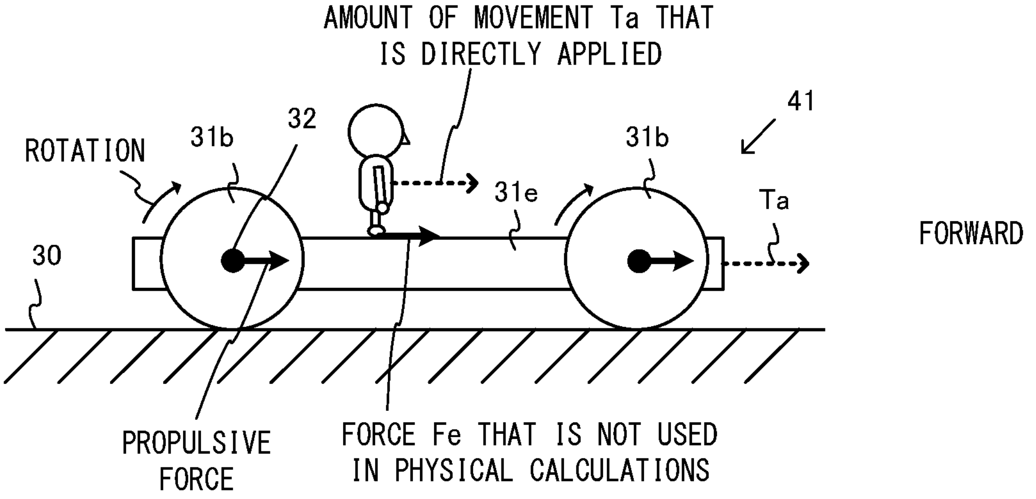
FIG. 8 is an example non-limiting diagram of the player character PC moving while mounting the four-wheel vehicle object 41 from a lateral view in a virtual space, and is an example non-limiting diagram showing forces applied to dynamic objects and the movement of the four-wheel vehicle object 41.

FIG. 8 is a diagram of the player character PC moving while mounting the four-wheel vehicle object 41 from a lateral view in the virtual space, and is a diagram showing forces applied to dynamic objects and the movement of the four-wheel vehicle object 41.

As shown in FIG. 8, various forces are applied to the dynamic objects included in the four-wheel vehicle object 41. FIG. 8 shows only forces regarding the movements of the objects for ease of illustration. For example, gravity downward in the virtual space is applied to the objects (the dynamic objects and the player character PC), but is omitted in FIG. 8.

When in the operating state, the wheel objects 31*b* rotate in predetermined directions. If the wheel objects 31*b* are in contact with the ground 30, the wheel objects 31*b* generate forward propulsive forces by the rotation. The wheel objects 31*b* and the board object 31*e* are connected together by connection objects 32, and the propulsive forces of the wheel objects 31*b* are transmitted to the board object 31*e* via the connection objects 32, whereby a forward force is applied to the board object 31*e*. The four-wheel vehicle object 41 moves forward by this force.

In game processing according to the exemplary embodiment, physical calculations (calculations based on the laws of physics) are made on each dynamic object at predetermined frame time intervals, whereby the velocity, the angular velocity, the position, the orientation, and the like of the dynamic object are calculated. Specifically, physical calculations are made based on the propulsive force of the dynamic object itself, mutual effects (a force to be received and a force to be applied) due to contact between dynamic objects, a force to be received from the environment (e.g., a wind or friction with the ground), and the like, and the latest velocity, angular velocity, position, orientation, and the like of each dynamic object are calculated. The movement (the amount of movement and the moving direction) of a dynamic object in a single frame is obtained based on the difference between the latest position of the dynamic object and the position of the dynamic object in the previous frame.

Similar physical calculations are also made on the player character PC. For example, if a dynamic object 31 collides with the player character PC from the side, a force due to this collision is applied to the player character PC, and the velocity, the angular velocity, the position, and the orientation of the player character PC are calculated by physical calculations based on this force. Consequently, for example, the player character PC moves in the horizontal direction.

If the player character PC is mounting a dynamic object, the position of the player character PC is calculated by an adsorption process instead of a movement by a force such as friction received by the player character PC from the dynamic object that the player character PC is mounting. That is, among all forces to be applied to the player character PC, the force to be received from the dynamic object that the player character PC is mounting is not used in the physical calculations. Instead of this, the same movement as the movement of the dynamic object that the player character PC is mounting is applied to the player character PC. Specifically, the movement of the position of the player character PC on the dynamic object (the contact position of the dynamic object and the player character PC) may be calculated, and the movement of the contact position may be applied to the player character PC.

For example, as shown in FIG. 8, if the player character PC is mounting the board object 31*e*, the board object 31*e* moves, whereby, normally, the player character PC receives a force Fe from the board object 31*e*. Physical calculations are made based on the force Fe from the board object 31*e*, whereby the movement (the amount of movement and the moving direction) of the player character PC can be calculated. In the exemplary embodiment, however, if the player character PC is mounting the board object 31*e*, physical calculations based on the force Fe from the board object 31*e* are not made, and the same movement Ta itself as a movement Ta of the board object 31*e* is applied to the player character PC. Consequently, the player character PC moves in the virtual space with the movement of the four-wheel vehicle object 41 without the position of the player character PC on the board object 31*e* being shifted.

There is also a case where a force different from the force Fe from the board object 31*e* is applied to the player character PC. There is a case where physical calculations based on this force different from the force Fe are made, and the player character PC moves in accordance with the results of the physical calculations. For example, when the player character PC is moving while mounting the board object 31*e*, and if another object collides with the player character PC from the side, the player character PC may be flown by this collision.

Further, in accordance with a direction operation input (e.g., a direction operation input to the analog stick 6L) provided by the player, the player character PC moves on the ground in the virtual space. Even when the player character PC is mounting a dynamic object that is moving, the player character PC moves on the dynamic object that is moving in accordance with a direction operation input provided by the player.

Figure 9:
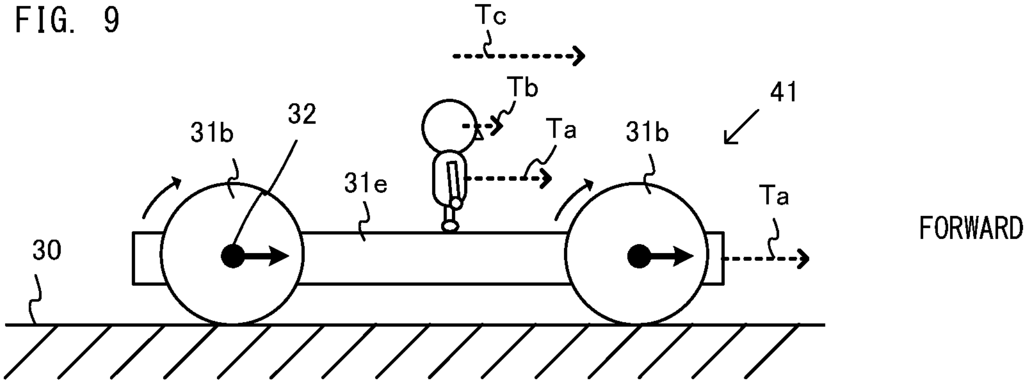
FIG. 9 is an example non-limiting diagram showing the state where, when the player character PC is mounting the four-wheel vehicle object 41 that is moving, the player character PC further moves on the four-wheel vehicle object 41 in accordance with a direction operation input.

FIG. 9 is a diagram showing the state where, when the player character PC is mounting the four-wheel vehicle object 41 that is moving, the player character PC further moves on the four-wheel vehicle object 41 in accordance with a direction operation input.

As shown in FIG. 9, when the player character PC is mounting the four-wheel vehicle object 41 that is moving, and if a direction operation input is provided by the player, the movement Ta of the four-wheel vehicle object 41 is added to a movement Tb of the player character PC relating to the direction operation input. Consequently, a movement Tc (=Ta+Tb) in the virtual space of the player character PC is calculated. As described above, the movement Ta of a dynamic object is added to the movement Tb of the player character PC, whereby, when the player character PC is moving while mounting the dynamic object, it is possible to further move the player character PC on the dynamic object.

Figure 10:
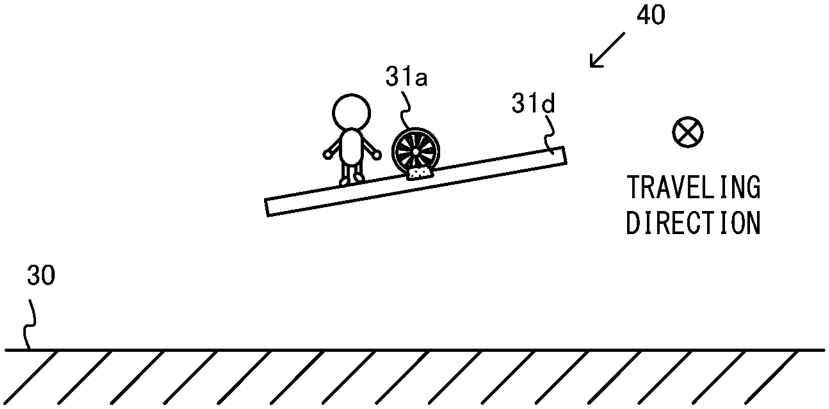
FIG. 10 is an example non-limiting diagram showing the state where the player character PC moves while mounting the airplane object 40.

The same applies to a case where the player character PC is mounting another dynamic object. FIG. 10 is a diagram showing the state where the player character PC moves while mounting the airplane object 40. The airplane object 40 is flying at a predetermined velocity in the depth direction of the plane of the paper in FIG. 10.

The player character PC is mounting the wing object 31*d* of the airplane object 40 and moves on the wing object 31*d* in accordance with an operation input provided by the player. Specifically, if the player character PC is mounting the wing object 31*d* of the airplane object 40, the wing object 31*d* enters the adsorption state, and the movement of the airplane object 40 (the wing object 31*d*) is added to the movement of the player character PC. The movement of the airplane object 40 is calculated by physical calculations based on the propulsive force of the fan object 31*a*, gravity applied to the airplane object 40, gravity applied to the player character on the airplane object 40, the influence of a wind, and the like.

Here, as shown in FIG. 10, for example, if the player character PC moves to a position on the left side of the wing object 31*d*, the position of the center of gravity of the entirety of the airplane object 40 including the player character PC is shifted to the left side. This tilts the entirety of the airplane object 40 including the wing object 31*d* to the left side and changes the traveling direction of the airplane object 40. This change in the traveling direction is calculated by physical calculations. That is, when the wing object 31*d* is in a horizontal orientation, a lift force acts in the up direction in the virtual space by the wing object 31*d*, and the airplane object 40 moves straight ahead. If the wing object 31*d* is tilted to the left side, the lift force of the wing object 31*d* is tilted to the left side, and a force in the left direction is applied to the wing object 31*d*. Consequently, the airplane object 40 moves in the depth direction on the plane of the paper and the left direction.

This movement in the depth direction and the left direction of the airplane object 40 (the wing object 31*d*) is applied to the player character PC. Consequently, the player character PC moves with the wing object 31*d* in the virtual space. Here, the rotation (the rotation in the roll direction) of the wing object 31*d* is not applied to the player character PC. That is, even if the wing object 31*d* is tilted to the left side, the player character PC is not tilted to the left side similarly to the wing object 31*d*, and maintains an orientation in which the player character PC stands upright. The orientations of the feet of the player character PC, however, are adjusted to match the tilt of the wing object 31*d* at the feet. The same applies to not only a case where the wing object 31*d* rotates in the roll direction, but also a case where the wing object 31*d* rotates in the pitch direction. Regarding any of the roll, pitch, and yaw directions, the rotation of the wing object 31*d* may be applied to the player character PC. For example, in a case where the wing object 31*d* rotates in the roll direction and the yaw direction, the rotation in the roll direction of the wing object 31*d* may not be applied to the player character PC, but the rotation in the yaw direction of the wing object 31*d* may be applied to the player character PC.

Although not shown in the figures, the same applies to a case where the player character PC is mounting the four-wheel vehicle object 41. For example, if the four-wheel vehicle object 41 rotates in the roll direction or the pitch direction while running, only the movement of the board object 31*e* included in the four-wheel vehicle object 41 may be applied to the player character PC, and the rotation in the roll direction or the pitch direction may not be applied to the player character PC.

As described above, if the player character PC is mounting a dynamic object 31, the movement of the dynamic object 31 is applied to the player character PC, but the rotation of the dynamic object 31 is not applied to the player character PC. Consequently, even if the dynamic object 31 rotates while moving, it is possible to move the player character PC with the dynamic object 31 while maintaining its orientation. Also in this case, if another force to tilt the player character PC acts, the player character PC is tilted by this force.

If the player character PC is mounting a dynamic object 31, the same rotation as the rotation of the dynamic object 31 may be applied to the player character PC. If the player character PC is mounting a dynamic object 31, rotation smaller than the rotation of the dynamic object 31 may be applied to the player character PC. In this case, the player character PC also rotates by the rotation of the dynamic object 31, but the amount of rotation of the player character PC is reduced.

As described above, in the game according to the exemplary embodiment, various dynamic objects are placed in the virtual space, and the player can move the player character PC in the virtual space with the player character PC mounting a dynamic object. The player can also generate various assembly objects by freely combining a plurality of dynamic objects and move the player character PC with the player character PC mounting the generated assembly objects. In such a game with a high degree of freedom, physical calculations are made on each object in the virtual space, whereby it is possible to control the motion of each object. However, in a case where it is assumed that the player character PC is moved with the player character PC mounting a dynamic object, and if the movements of the dynamic object and the player character PC are calculated based on physical calculations, the position of the player character PC on the dynamic object may be shifted, or the player character PC may move away from the dynamic object that the player character PC is mounting in a predetermined situation. For example, the movement of the player character PC may be delayed or shifted with respect to the movement of a dynamic object due to the velocity of each object or an error in calculation. For example, if an object that generates a very great force (e.g., a rocket object) is connected to a dynamic object that the player character PC is mounting, a great acceleration may be applied to the dynamic object that the player character PC is mounting, and the player character PC may fall from the dynamic object. However, when the player character PC is mounting a dynamic object, the movement of the dynamic object that the player character PC is mounting is applied to the player character PC, whereby it is possible to move the player character PC without being shifted from the position where the player character PC stands, and moving away from the dynamic object. The movement of a dynamic object that the player character PC is mounting is added to the movement of the player character PC, whereby, even when the player character PC is mounting a dynamic object, for example, it is possible to further move the player character PC on the dynamic object in accordance with a movement operation input provided by the player, or further move the player character PC by another force.

(Control Over First Special Object)

Next, the first special object 31*c* is described. The first special object 31*c* has a non-operating state and an operating state and performs a predetermined behavior in accordance with the fact that the first special object 31*c* enters the operating state. Specifically, the first special object 31*c* is in a first orientation in the non-operating state, but in accordance with the fact that the first special object 31*c* enters the operating state, the first special object 31*c* generates a force to change from the first orientation to a second orientation. Normally, the first special object 31*c* is set to the non-operating state and placed in the first orientation in the virtual space. The first special object 31*c* can also be combined with another dynamic object 31 based on the object operation action.

Figure 11:
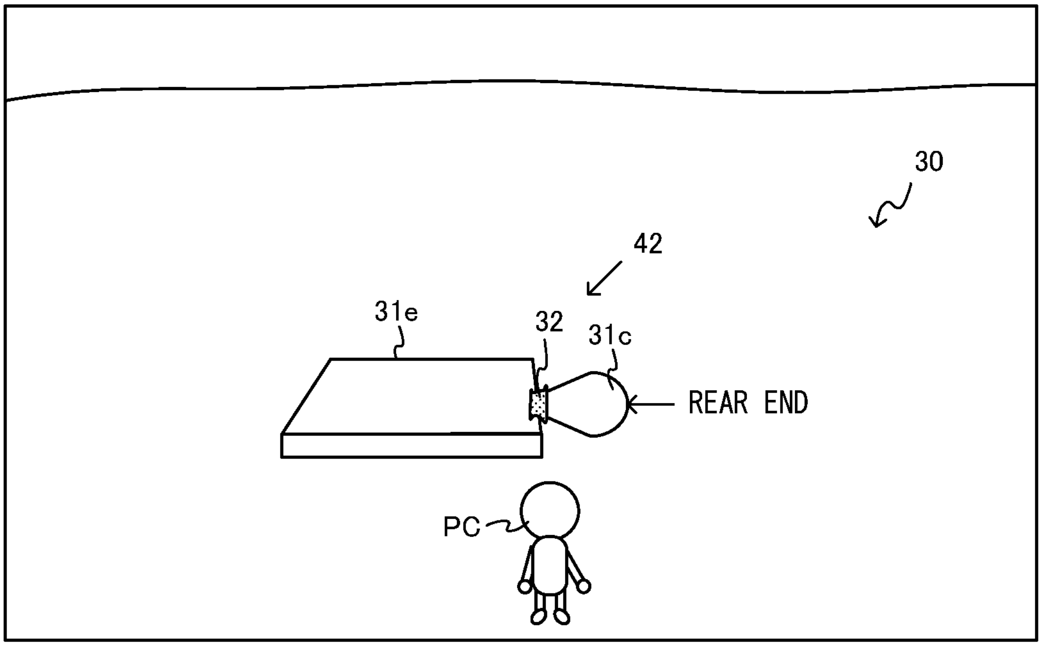
FIG. 11 is an example non-limiting diagram showing an example of an assembly object 42 including a first special object 31*c* and a board object 31*e:*
Figure 12:
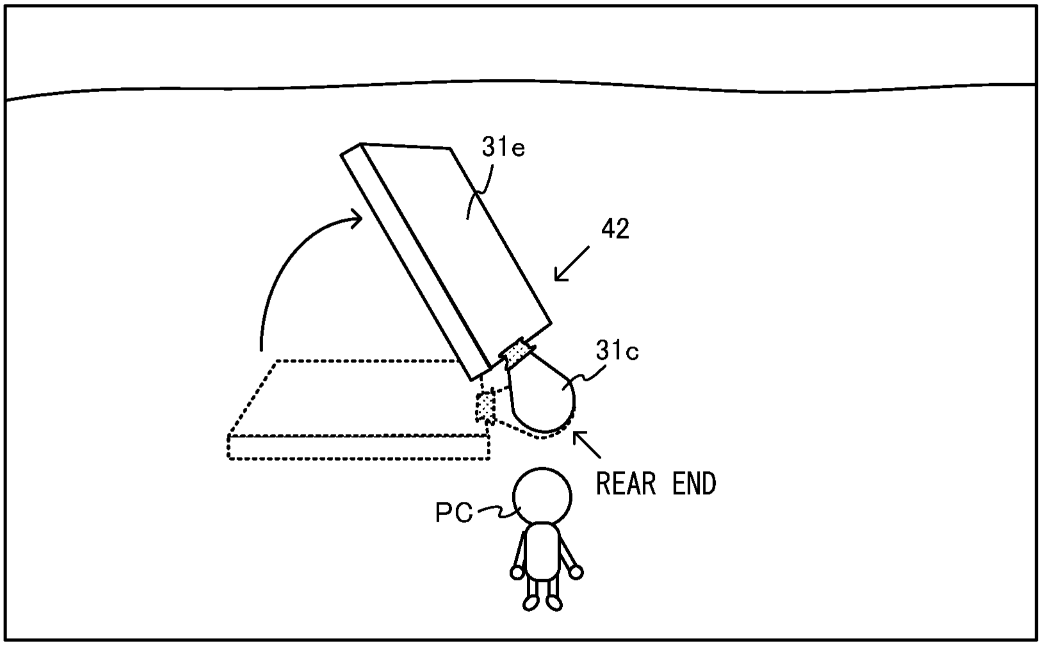
FIG. 12 is an example non-limiting diagram showing the state where, when the first special object 31*c* enters an operating state, the assembly object 42 including the first special object 31*c* and the board object 31*e* performs a predetermined behavior.

FIG. 11 is a diagram showing an example of an assembly object 42 including the first special object 31*c* and the board object 31*e*. FIG. 12 is a diagram showing the state where, when the first special object 31*c* enters the operating state, the assembly object 42 including the first special object 31*c* and the board object 31*e* performs a predetermined behavior.

As shown in FIG. 11, the assembly object 42 including the first special object 31*c* and the board object 31*e* is placed on the ground 30 in the virtual space. A front end portion of the first special object 31*c* and a side surface of the board object 31*e* are connected together by a connection object 32. The first special object 31*c* is in the non-operating state and is in the first orientation in which a line connecting the front end portion and a rear end portion of the first special object 31*c* is approximately parallel to the ground 30. Similarly, the board object 31*e* is also in the first orientation in which the board object 31*e* is approximately parallel to the ground 30.

If the first special object 31*c* enters the operating state in this state, the first special object 31*c* rotates about the rear end portion (FIG. 12). Specifically, the first special object 31*c* rotates so that a line from the rear end portion to the front end portion changes to the second orientation in which the line is directed upward in the virtual space (an orientation in which the first special object 31*c* stands up). The assembly object 42 performs an action in a unified manner, and therefore, similarly to the first special object 31, the board object 31*e* also rotates to change from the first orientation to the second orientation. Then, if a predetermined time elapses after the first special object 31*c* enters the operating state, the first special object 31*c* changes to the second orientation, and the assembly object 42 changes to an orientation in which the first special object 31*c* stands perpendicular to the ground 30.

Such a behavior of the assembly object 42 is also calculated by physical calculations. Each of the first special object 31*c* and the board object 31*e* has mass, and gravity is applied to each of the first special object 31*c* and the board object 31*e*. The first special object 31*c* generates a force to change to the second orientation in the operating state, and the board object 31*e* receives this force from the first special object 31*c*. Based on a force to be applied to each of the first special object 31*c* and the board object 31*e*, physical calculations are made.

The player character PC can mount the assembly object 42. Even when the player character PC is mounting (the board object 31*e* of) the assembly object 42, but if the first special object 31*c* enters the operating state, the assembly object 42 including the first special object 31*c* performs the action shown in FIG. 12.

Figure 13:
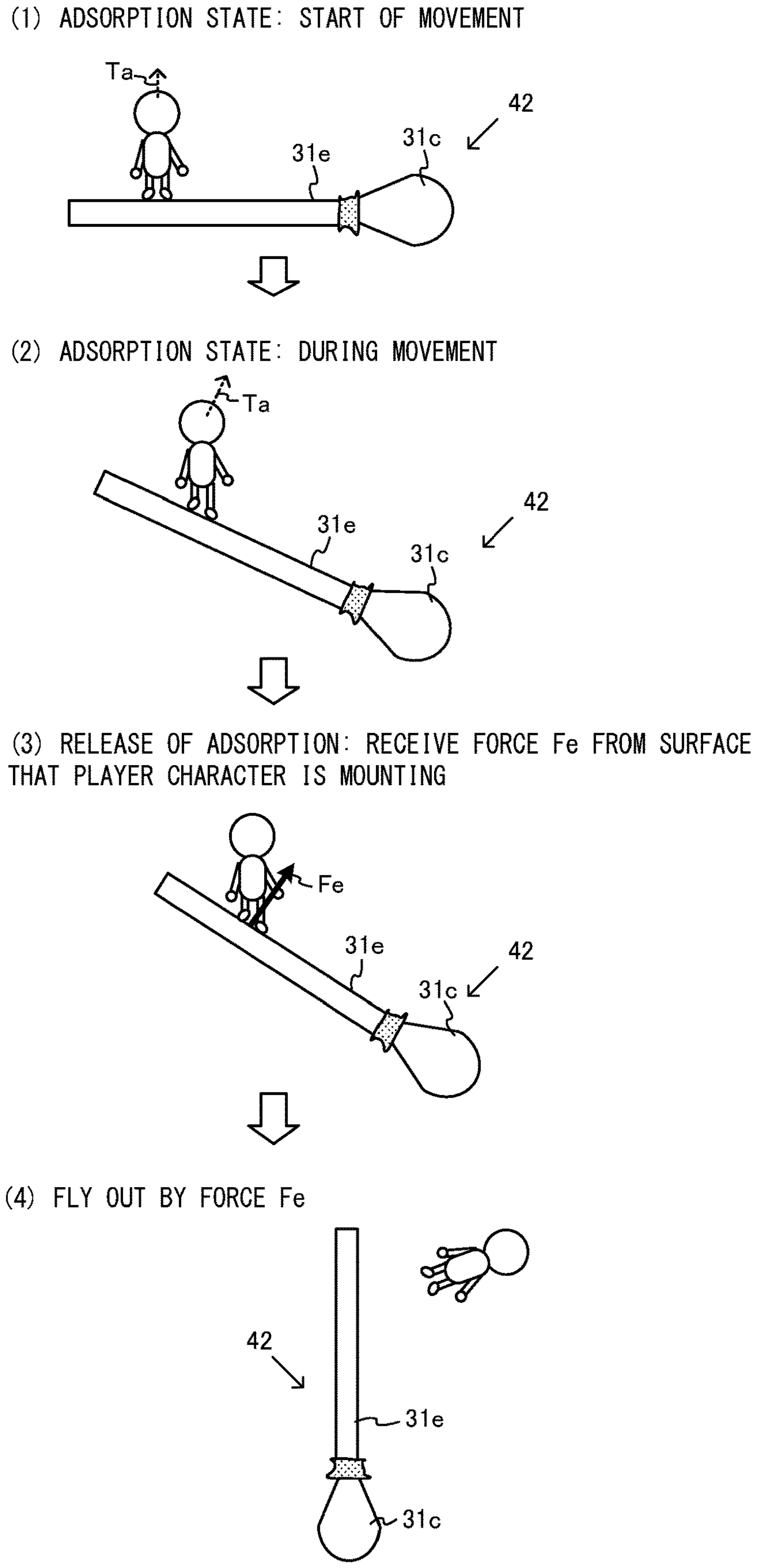
FIG. 13 is an example non-limiting diagram showing the state where, when the player character PC is mounting the assembly object 42 including the first special object 31*c*, the first special object 31*c* performs a predetermined behavior.

FIG. 13 is a diagram showing the state where, when the player character PC is mounting the assembly object 42 including the first special object 31*c*, the first special object 31*c* performs a predetermined behavior.

As shown in FIG. 13, if the player character PC is mounting the board object 31*e* of the assembly object 42, the board object 31*e* is set to the adsorption state where the player character PC is caused to adsorb to the board object 31*e*. In this case, similarly to the above, the movement of the board object 31*e* is applied to the player character PC ((1) to (2) in FIG. 13). During this period, for example, if the player character PC further moves due to another factor such as a direction operation input provided by the player or a collision with another dynamic object, the movement of the player character PC due to the other factor is added to the movement of the board object 31*e*.

Specifically, the board object 31*e* rotates about the rear end portion of the first special object 31*c*, and the position of the player character PC on the board object 31*e* (the contact position of the board object 31*e* and the player character PC) moves by this rotation. The rotation of the board object 31*e* is calculated based on physical calculations, the movement of the contact position of the board object 31*e* and the player character PC is calculated based on this rotation, and the movement of the contact position is applied to the player character PC. Consequently, while the board object 31*e* moves (while the board object 31*e* rotates about the rear end portion of the first special object 31*c*), it is possible to move the player character PC by causing the player character PC to adsorb to the board object 31*e*. For example, if a direction operation input is further provided, it is possible to move the player character PC on the board object 31*e*.

Here, if a predetermined time elapses after the first special object 31*c* enters the operating state, the board object 31*e* enters an adsorption release state ((3) in FIG. 13). In the adsorption release state, the process of applying the same movement as the movement of the board object 31*e* to the player character PC is not performed, and physical calculations based on the force Fe received from the board object 31*e* by the player character PC are made. As the results of these physical calculations, for example, the player character PC flies out away from the board object 31*e* ((4) in FIG. 13).

As described above, the first special object 31*c* has a non-operating state and an operating state and performs a predetermined behavior of changing from a first orientation to a second orientation in accordance with the fact that the first special object 31*c* changes from the non-operating state to the operating state. The first special object 31*c* has the function of, during a predetermined period when the first special object 31*c* is performing the predetermined behavior, bringing the first special object 31*c* and a dynamic object connected to the first special object 31*c* into the adsorption release state. If the first special object 31*c* enters the adsorption release state, in an assembly object including the first special object 31*c* and a plurality of dynamic objects, all the dynamic objects in the assembly object enter the adsorption release state. During a first period after the first special object 31*c* starts the predetermined behavior, a dynamic object connected to the first special object 31*c* maintains the adsorption state. During a second period after the first period elapses, the dynamic object enters the adsorption release state. Even during the second period, for example, if the angular velocity of the first special object 31*c* does not exceed a threshold, the adsorption state may be maintained.

In the adsorption state, the process of adding the movement of a dynamic object that the player character PC is mounting to the movement of the player character PC is performed. In the adsorption release state, the movement of the player character PC is calculated based on physical calculations associated with contact between the player character PC and a dynamic object. That is, in the adsorption release state, the process of adding the movement of the dynamic object to the movement of the player character PC is not performed, and the movement of the player character PC is calculated based on physical calculations associated with contact between the player character PC and the dynamic object that the player character PC is mounting (a movement based on contact with the dynamic object that the player character PC is mounting: here referred to as a "second movement"). To the second movement calculated by these physical calculations, the movement of the player character PC due to another factor (e.g., a movement relating to a direction operation input) is further added.

Consequently, if the player character PC is mounting a dynamic object, it is possible to move the player character PC by causing the player character PC to adsorb to the dynamic object, release the adsorption in the middle, and cause the player character PC to perform another behavior such as moving at a distance from the dynamic object.

Figure 14:
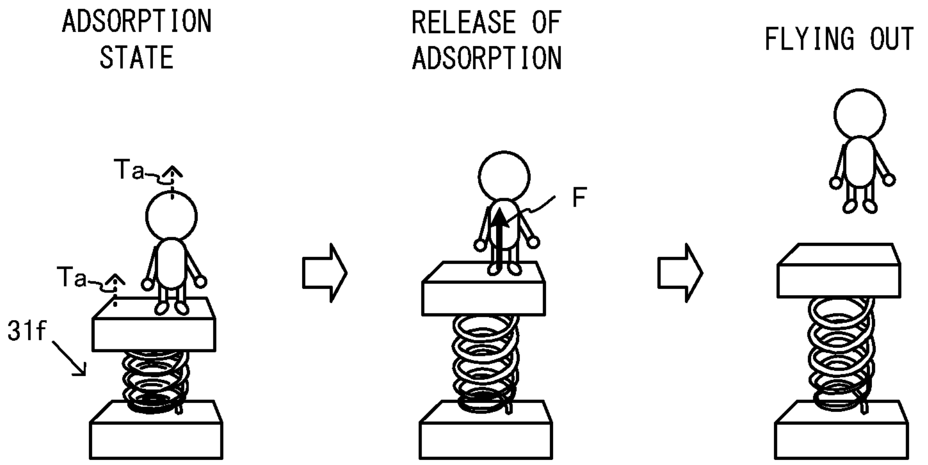
FIG. 14 is an example non-limiting diagram showing an example of the state where, in a case where the player character PC is mounting the second special object 31*f*, the second special object 31*f* performs a predetermined behavior.

Next, the second special object 31*f* is described. FIG. 14 is a diagram showing an example of the state where, in a case where the player character PC is mounting the second special object 31*f*, the second special object 31*f* performs a predetermined behavior.

The second special object 31*f* has a non-operating state and an operating state and performs a predetermined behavior of changing from a contracted state to an expanded state in accordance with the fact that the second special object 31*f* enters the operating state. The second special object 31*f* further performs a predetermined behavior of changing from the expanded state to the contracted state in accordance with the fact that the second special object 31*f* enters the non-operating state. Alternatively, the second special object 31*f* may perform the behavior of repeatedly transitioning to the contracted state and the expanded state in accordance with the fact that the second special object 31*f* enters the operating state.

As shown in FIG. 14, if the player character PC is mounting the second special object 31*f*, the second special object 31*f* is in the adsorption state while the second special object 31*f* changes from the contracted state to reach a predetermined length. In the adsorption state, the same movement as the movement of an upper surface of the second special object 31*f* is applied to the player character PC. Even in a case where the player character PC is mounting the second special object 31*f*, the player character PC can move on the second special object 31*f* in accordance with a direction operation input. In this case, the movement of the upper surface of the second special object 31*f* is added to the movement of the player character PC. If the spring reaches the predetermined length, the second special object 31*f* enters the adsorption release state. In this case, the process of adding the movement of the upper surface of the second special object 31*f* to the movement of the player character PC is not performed. Instead of this, the movement of the player character PC is calculated based on physical calculations associated with contact between the player character PC and the upper surface of the second special object 31*f* that the player character PC is mounting. Consequently, for example, the player character PC flies out upward away from the upper surface of the second special object 31*f*.

As described above, the second special object 31*f* has a non-operating state and an operating state and performs the predetermined behavior of changing from the contracted state to the expanded state in accordance with the fact that the second special object 31*f* enters the operating state. In a case where the player character PC is mounting the second special object 31*f*, during a first period when the second special object 31*f* is performing the predetermined behavior, the second special object 31*f* enters the adsorption state. During a second period, the second special object 31*f* enters the adsorption release state. Consequently, during the first period, it is possible to move the player character PC by causing the player character PC to adsorb onto the second special object 31*f*. During the second period, it is possible to move the player character PC away from the second special object 31*f*.

(Restriction on Object Operation Action on Dynamic Object)

Next, a description is given of the restriction on the object operation action when the player character PC is mounting a dynamic object. As described above, based on the object operation action of the player character PC, it is possible to move a dynamic object 31 placed in the virtual space. If the player character PC is mounting a dynamic object, the movement of the dynamic object based on the object operation action may be restricted.

Figure 15:
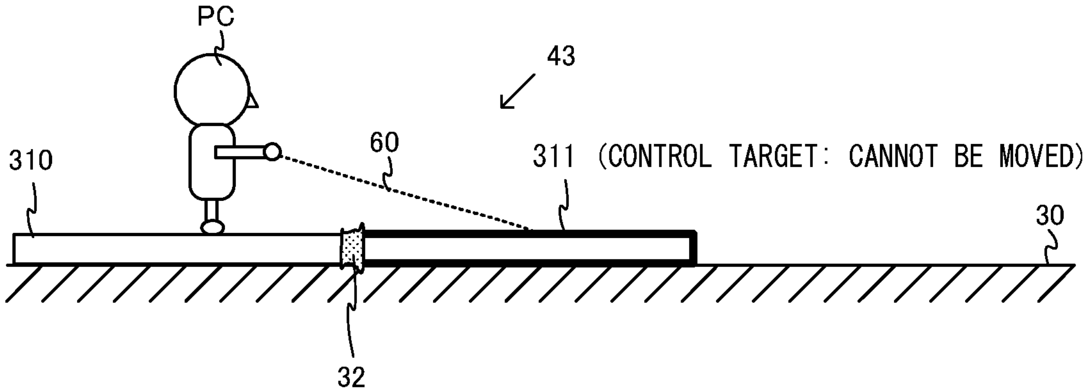
FIG. 15 is an example non-limiting diagram showing an example of the situation where, when the player character PC is mounting a dynamic object, another dynamic object cannot be moved based on the object operation action.
Figure 15:
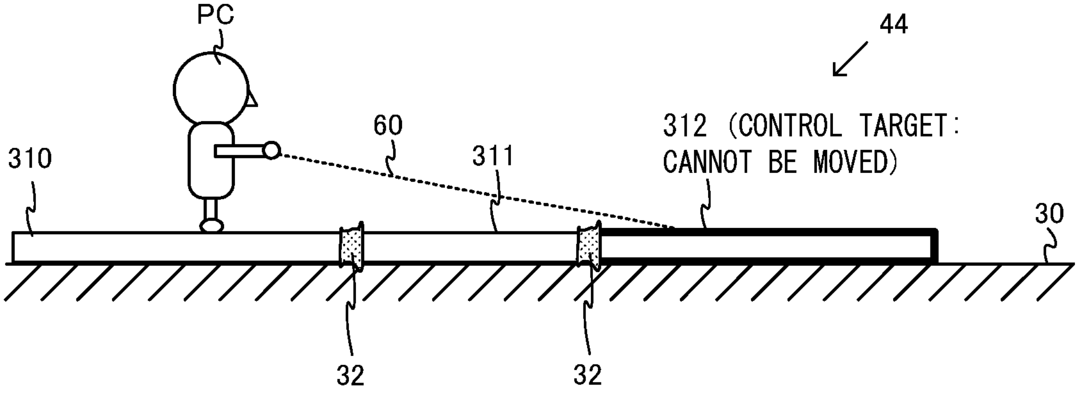

FIG. 15 is a diagram showing an example of the situation where, when the player character PC is mounting a dynamic object, another dynamic object cannot be moved based on the object operation action.

In case 1 shown in FIG. 15, a dynamic object 310 and a dynamic object 311 are connected together by a connection object 32, and the dynamic object 310 and the dynamic object 311 form an assembly object 43. The player character PC is mounting the dynamic object 310. In this case, even if the player character PC attempts to perform the object operation action on the dynamic object 311 as a control target, the player character PC cannot move the dynamic object 311 based on the object operation action.

In case 2 shown in FIG. 15, the dynamic object 310 and the dynamic object 311 are connected together, a dynamic object 312 is further connected to the dynamic object 311, and the three dynamic objects 310 to 312 form an assembly object 44. The player character PC is mounting the dynamic object 310. In this case, even if the player character PC attempts to perform the object operation action on the dynamic object 312 as a control target, the player character PC cannot move the dynamic object 312 based on the object operation action.

That is, if an assembly object including a dynamic object specified as a control target of the object operation action includes a dynamic object that the player character PC is mounting, the control target is not moved based on the object operation action. In other words, if the player character PC is mounting an assembly object, a dynamic object included in the assembly object is controlled not to move based on the object operation action.

Similarly, a dynamic object that the player character PC is directly mounting is not moved based on the object operation action, either. For example, in case 1 or 2, the player cannot set the dynamic object 310 as a control target of the object operation action and move the dynamic object 310 based on the object operation action.

The object operation action moves a control target based on the position of the player character PC. If a dynamic object included in an assembly object that the player character PC is mounting is moved based on the object operation action, the entirety of the assembly object moves by the movement of the dynamic object. If the entirety of the assembly object moves, the player character PC also moves, and the control target further moves by the movement of the player character PC, and the entirety of the assembly object further moves. As described above, if a dynamic object included in an assembly object that the player character PC is mounting is moved based on the object operation action, the assembly object may continue to move, and it may be difficult to operate a control target based on the object operation action.

Thus, in the exemplary embodiment, if an assembly object including a dynamic object as a control target includes a dynamic object that the player character PC is mounting, the control target is controlled not to move based on the object operation action.

An assembly object including a dynamic object that the player character PC is mounting may be configured not to be a control target of the object operation action.

Figure 16:
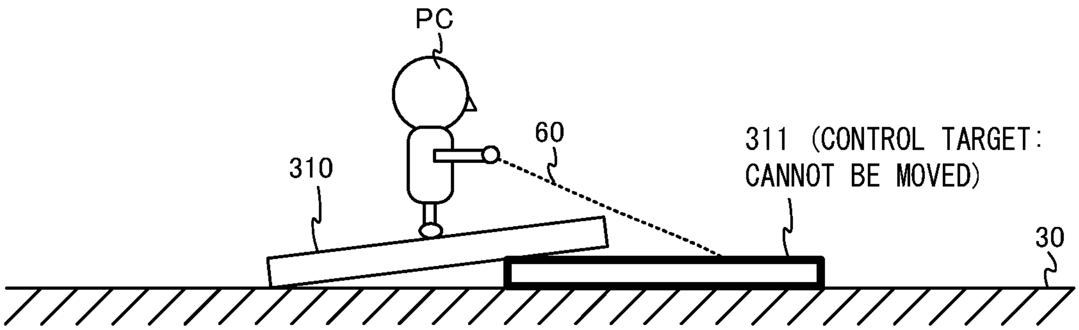
FIG. 16 is an example non-limiting diagram showing an example of the situation where, when the player character PC is mounting a dynamic object, another dynamic object cannot be moved based on the object operation action.
Figure 16:
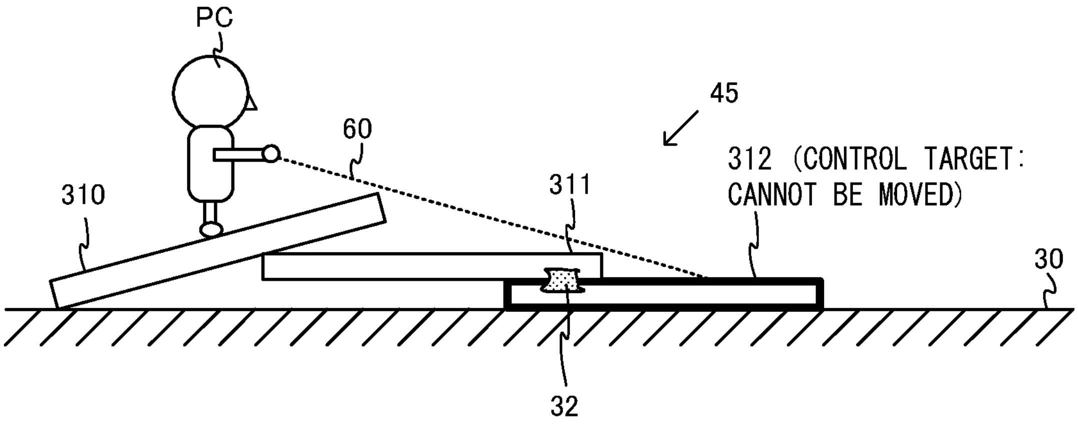

FIG. 16 is a diagram showing an example of the situation where, when the player character PC is mounting a dynamic object, another dynamic object cannot be moved based on the object operation action.

In case 3 shown in FIG. 16, the dynamic object 310 and the dynamic object 311 are not connected together, and the dynamic object 310 is mounting the dynamic object 311. The player character PC is mounting the dynamic object 310. It can be said that the dynamic object 311 is in the state where the dynamic object 311 is indirectly mounted by the player character PC. In this case, the player cannot move the dynamic object 311 based on the object operation action. As described above, a dynamic object indirectly mounted by the player character PC 311 is controlled not to move based on the object operation action.

In case 4 shown in FIG. 16, the dynamic object 311 and the dynamic object 312 are connected together, and the dynamic object 311 and the dynamic object 312 form an assembly object 45. The dynamic object 310 is mounting the dynamic object 311 as a part of the assembly object 45. The player character PC is mounting the dynamic object 310. In this case, it can be said that the assembly object 45 is indirectly mounted by the player character PC. In this case, the player cannot move the dynamic object 312 based on the object operation action. As described above, the dynamic object 312 included in the assembly object 45 indirectly mounted by the player character PC is controlled not to move based on the object operation action.

Figure 17:
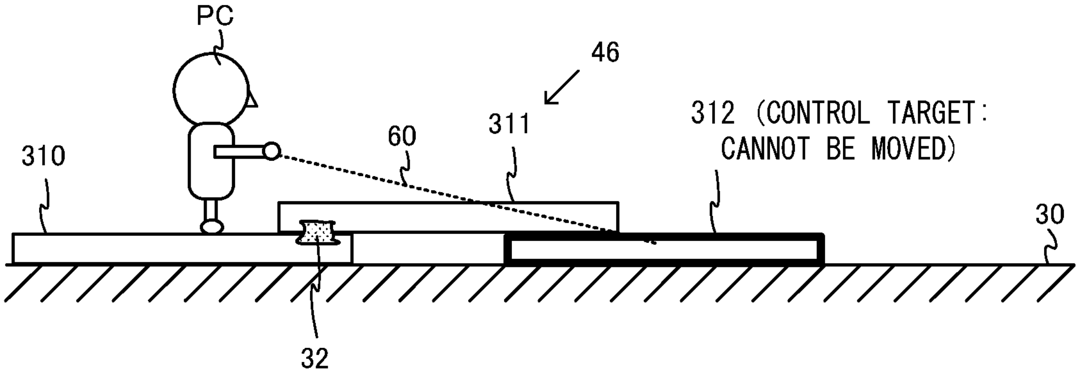
FIG. 17 is an example non-limiting diagram showing an example of the situation where, when the player character PC is mounting a dynamic object, another dynamic object cannot be moved based on the object operation action.
Figure 17:
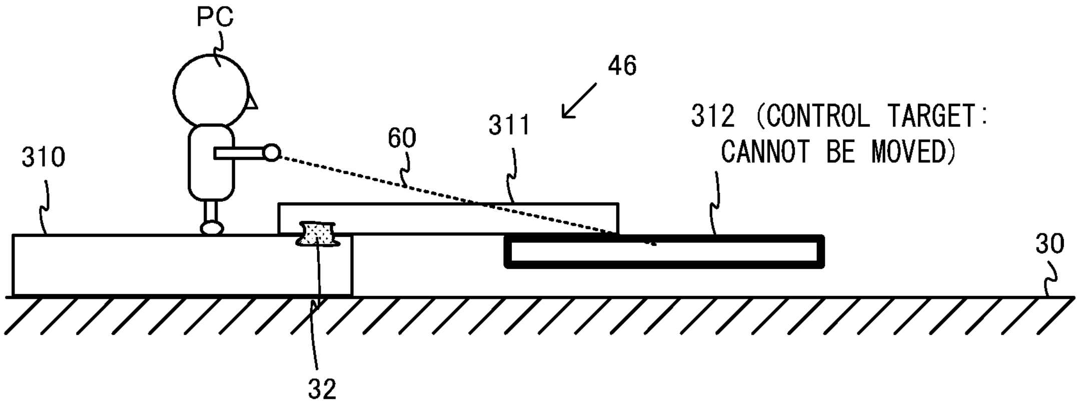
Figure 17:
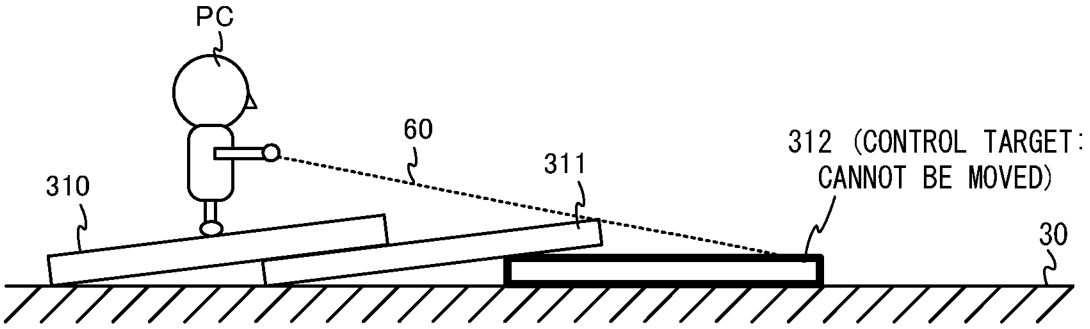

FIG. 17 is a diagram showing an example of the situation where, when the player character PC is mounting a dynamic object, another dynamic object cannot be moved based on the object operation action.

In case 5 shown in FIG. 17, the dynamic object 310 and the dynamic object 311 are connected together, and the dynamic object 310 and the dynamic object 311 form an assembly object 46. The dynamic object 312 is not connected to another dynamic object, and the dynamic object 311 is mounting the dynamic object 312. The player character PC is mounting the dynamic object 310. In this case, the player cannot move the dynamic object 312 based on the object operation action. It can be said that the dynamic object 312 is in the state where the dynamic object 312 is indirectly mounted by the player character PC.

In case 6 shown in FIG. 17, the dynamic object 310 and the dynamic object 311 are connected together, and the dynamic object 310 and the dynamic object 311 form the assembly object 46. The player character PC is mounting the dynamic object 310. The dynamic object 312 is a control target of the object operation action. If the dynamic object 312 comes into contact with a lower portion of the dynamic object 311 by moving the dynamic object 312 upward based on the object operation action, the dynamic object 311 and the dynamic object 312 enter the state where the dynamic object 311 laps over the dynamic object 312 at this moment. The state where the dynamic object 311 laps over the dynamic object 312 can also be regarded as the state where the dynamic object 312 is indirectly mounted by the player character PC. In this case, the dynamic object 312 is controlled not to further move based on the object operation action. That is, the player cannot further move the dynamic object 312 upward or move the dynamic object 312 to the left and right based on the object operation action. In this case, the player may be able to move the dynamic object 312 downward and move the dynamic object 312 away from the dynamic object 311 based on the object operation action. If the dynamic object 312 comes into contact with a lower portion of the dynamic object 311 during the movement of the dynamic object 312 based on the object operation action, a force against gravity based on the object operation action may be cut, and the dynamic object 312 as the control target may slightly fall. This slight fall may move the dynamic object 312 as the control target away from the dynamic object 311 and bring the dynamic object 312 into the state where the dynamic object 312 can be moved based on the object operation action again.

In case 7 shown in FIG. 17, none of the dynamic objects 310 to 312 is connected. The dynamic object 311 is mounting the dynamic object 312, and the dynamic object 310 is further mounting the dynamic object 311. The player character PC is mounting the dynamic object 310. In this case, the player cannot move the dynamic object 312 based on the object operation action. It can be said that the dynamic object 312 is in the state where the dynamic object 312 is indirectly mounted by the player character PC.

As described above, a dynamic object indirectly mounted by the player character PC is controlled not to move based on the object operation action. If such a dynamic object indirectly mounted by the player character PC is moved based on the object operation action, the dynamic object 310 that the player character PC is mounting may move by the movement of the dynamic object. As a result, the position of the player character PC may change, the position of a control target may also change due to the change in the position of the player character PC, and it may be difficult to operate the control target.

Thus, in the exemplary embodiment, a dynamic object indirectly mounted by the player character PC or a dynamic object included in an assembly object indirectly mounted by the player character PC is controlled not to move based on the object operation action.

Here, "a dynamic object indirectly mounted by the player character PC or a dynamic object included in an assembly object indirectly mounted by the player character PC" is an object indirectly supporting the player character PC, and may be an object weighted by the player character PC. In the exemplary embodiment, mutual effects (a force to push and a force to be pushed) of the player character PC and all the dynamic objects are calculated by physical calculations. Based on the results of these physical calculations, it can be determined whether a dynamic object is supporting the player character PC.

As described above, in the game according to the exemplary embodiment, based on an operation input provided by the player, the player character PC is caused to perform the object operation action of operating a dynamic object placed in the virtual space. Specifically, based on the object operation action, a first operation of moving a specified dynamic object among a plurality of dynamic objects placed in the virtual space and a second operation of generating an assembly object by connecting (linking) the specified dynamic object to another dynamic object are performed. In a case where an assembly object including a dynamic object specified based on the object operation action includes a dynamic object in contact with the player character PC in the down direction of the player character PC (a dynamic object that the player character is mounting) (case 1 or 2), the dynamic objects cannot be moved based on the object operation action. Consequently, it is possible to prevent an assembly object that the player character PC is mounting from moving based on the object operation action. For example, it is possible to prevent an assembly object that the player character PC is mounting from continuing to move.

In the exemplary embodiment, in a case where a dynamic object in contact with the player character PC in the down direction of the player character PC is mounting a dynamic object specified based on the object operation action (case 3), the dynamic objects cannot be moved based on the object operation action. In a case where a dynamic object in contact with the player character PC in the down direction of the player character PC is mounting an assembly object including a dynamic object specified based on the object operation action (case 4), the dynamic objects cannot be moved based on the object operation action. Consequently, it is possible to prevent a dynamic object or an assembly object that the player character PC is indirectly mounting from moving based on the object operation action. Thus, it is possible to make it easy to operate a control target.

In the exemplary embodiment, in a case where the player character is directly mounting a dynamic object specified based on the object operation action, the dynamic object cannot be moved based on the object operation action. In a case where the player character is indirectly mounting a dynamic object specified based on the object operation action (cases 5 to 7), the dynamic object cannot be moved based on the object operation action. Consequently, it is possible to prevent a dynamic object that the player character PC is directly or indirectly mounting from moving based on the object operation action. Thus, it is possible to make it easy to operate a control target.

In the game according to the exemplary embodiment, it is possible to save design information regarding an assembly object generated by the player and reconstruct the assembly object based on the saved design information in accordance with an instruction given by the player. The design information includes information regarding the types and the number of dynamic objects included in the assembly object, the connection positions of dynamic objects, the orientation of each of the dynamic objects, and the like. The player can select the saved design information, where necessary, reconstruct the assembly object based on the design information, and cause the reconstructed assembly object to appear in the virtual space. In the reconstruction of the assembly object, it is possible to use a dynamic object placed in the virtual space and a dynamic object held as player character data 120 by the player character PC. For example, in a case where the assembly object saved as the design information includes a first dynamic object and a second dynamic object, it is possible to reconstruct the assembly object using the first dynamic object held by the player character PC and the second dynamic object placed in the virtual space. Specifically, when the assembly object is reconstructed, the second dynamic object placed in the virtual space moves and is incorporated as a part of the assembly object. A dynamic object directly or indirectly mounted by the player character PC may not be used in the reconstruction of the assembly object. That is, when the assembly object is reconstructed, the dynamic object directly or indirectly mounted by the player character PC does not move and is not incorporated as a part of the assembly object. For example, even in a case where the second dynamic object is placed in the virtual space, but if the player character PC is directly or indirectly mounting the second dynamic object, the second dynamic object is not used in the reconstruction of the assembly object, and the second dynamic object is not moved.

(Data Used in Game Processing)

Figure 18:
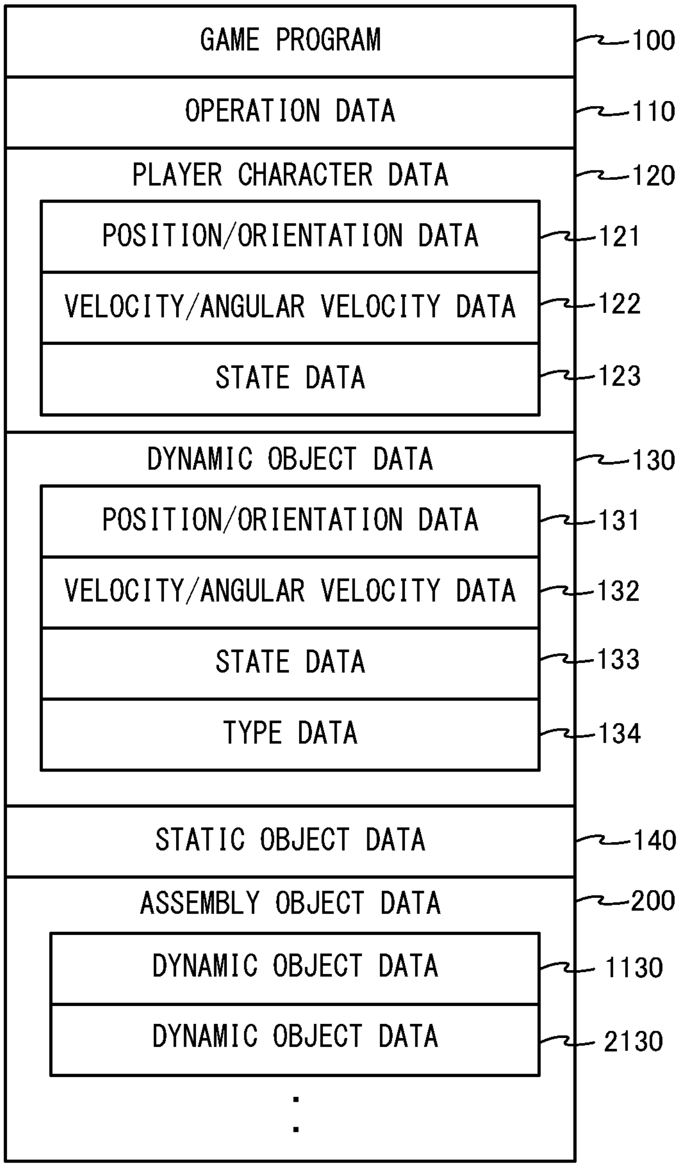
FIG. 18 is an example non-limiting diagram showing an example of data stored in a memory of the main body apparatus 2 during the execution of game processing.

Next, the details of game processing regarding the above game are described. First, data used in the game processing is described. FIG. 18 is a diagram showing an example of data stored in a memory of the main body apparatus 2 during the execution of the game processing.

As shown in FIG. 18, the memory (the DRAM 27, the flash memory 26, or the external storage medium) of the main body apparatus 2 stores a game program 100, operation data 110, player character data 120, dynamic object data 130, static object data 140, and assembly object data 200. As well as these pieces of data, various pieces of data used in game processing (e.g., data regarding an enemy character and the like) are stored in the memory.

The game program 100 is a program for executing the game processing described below. The game program is stored in advance in the external storage medium attached to the slot 29 or the flash memory 26, and when the game is executed, is loaded into the DRAM 27. The game program may be acquired from another apparatus via a network (e.g., the Internet).

The operation data 110 is data transmitted from the left controller 3 and the right controller 4 to the main body apparatus 2. The controllers 3 and 4 repeatedly transmit the operation data 110 to the main body apparatus 2 at predetermined time intervals (e.g., 1/200-second intervals).

The player character data 120 is data regarding the player character PC and includes position/orientation data 121, velocity/angular velocity data 122, and state data 123.

The position/orientation data 121 is data regarding the position and the orientation in the virtual space of the player character PC. Specifically, the position/orientation data 121 includes data indicating the position and the orientation of the player character PC in the latest frame and data indicating the position and the orientation of the player character PC at least in the immediately preceding frame.

The velocity/angular velocity data 122 is data regarding the velocity and the angular velocity in the virtual space of the player character PC. Specifically, the velocity/angular velocity data 122 includes data indicating the velocity and the angular velocity of the player character PC in the latest frame and data indicating the velocity and the angular velocity of the player character PC at least in the immediately preceding frame.

The state data 123 includes data indicating whether or not the player character PC is mounting a dynamic object. The state data 123 also includes data indicating whether or not the player character PC is performing the object operation action (operating a control target).

The dynamic object data 130 is data regarding the dynamic objects 31 placed in the virtual space. The dynamic object data 130 is stored with respect to each dynamic object 31 placed in the virtual space. The dynamic object data 130 includes position/orientation data 131, velocity/angular velocity data 132, state data 133, and type data 134.

The position/orientation data 131 is data regarding the position and the orientation in the virtual space of the dynamic object 31. Specifically, the position/orientation data 131 includes data indicating the position and the orientation of the dynamic object 31 in the latest frame and data indicating the position and the orientation of the dynamic object 31 at least in the immediately preceding frame.

The velocity/angular velocity data 132 is data regarding the velocity and the angular velocity in the virtual space of the dynamic object 31. Specifically, the velocity/angular velocity data 132 includes data indicating the velocity and the angular velocity of the dynamic object 31 in the latest frame and data indicating the velocity and the angular velocity of the dynamic object 31 at least in the immediately preceding frame.

The state data 133 is data regarding the state of the dynamic object 31. The state data 133 includes data indicating whether or not the dynamic object 31 is directly mounted by a character (the player character PC or a non-player character) and whether or not the dynamic object 31 is indirectly mounted by a character. The state data 133 also includes data indicating whether or not the dynamic object 31 is in the adsorption release state. The state data 133 of a dynamic object having a non-operating state and an operating state includes data indicating whether the dynamic object is in the operating state or the non-operating state.

The type data 134 is data indicating the type of the dynamic object 31. For example, the type data 134 includes data regarding the shape and the external appearance of the dynamic object 31, data regarding the mass of the dynamic object 31, and data regarding the behavior of the dynamic object 31 in a case where the dynamic object 31 is in the operating state (e.g., in a case where the dynamic object 31 generates a propulsive force, data regarding the magnitude of the propulsive force, the direction of the propulsive force, and the like).

The static object data 140 is data regarding the static objects placed in the virtual space (objects representing a rock, a mountain, a building, a ground, and the like fixed to the virtual space). The static object data 140 is stored with respect to each static object. The static object data 140 includes data regarding the position and the orientation of the static object, data regarding the type of the static object, and data regarding the shape and the external appearance of the static object.

The assembly object data 200 is data regarding assembly objects placed in the virtual space. The assembly object data 200 is stored with respect to each assembly object. The assembly object data 200 includes a plurality of pieces of dynamic object data (1130, 2130, and the like). The pieces of dynamic object data included in the assembly object data 200 have data similar to that of the dynamic object data 130.

Although not shown in the figures, the assembly object data 200 includes data indicating the position and the orientation in the assembly object of each of dynamic objects forming the assembly object and data indicating the connection positions of dynamic objects in the assembly object. The assembly object data 200 may also include data regarding the mass, the position of the center of gravity, the velocity, the angular velocity, and the like of the entirety of the assembly object.

(Details of Game Processing)

Figure 19:
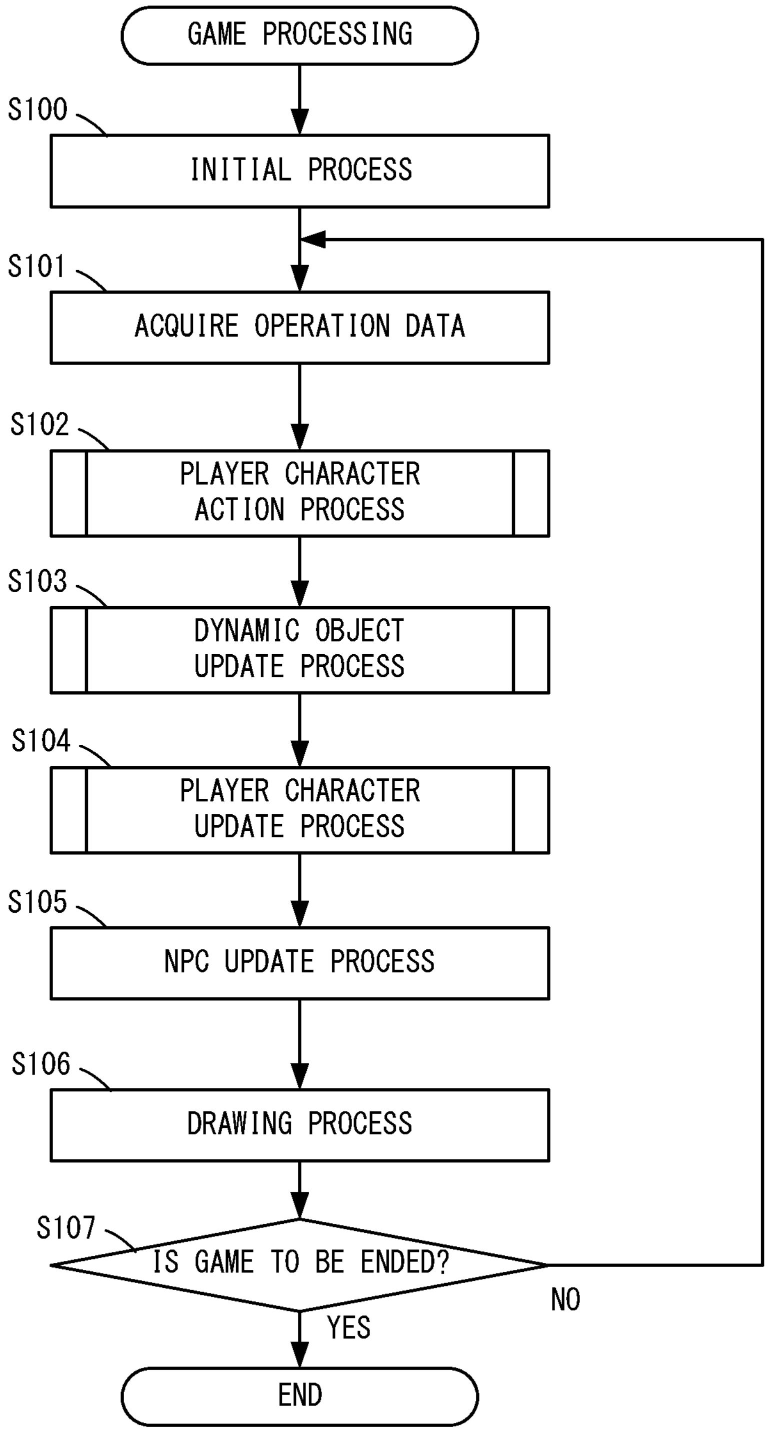
FIG. 19 is an example non-limiting flow chart showing an example of game processing executed by a processor 21.

Next, the details of game processing performed by the main body apparatus 2 are described. FIG. 19 is a flow chart showing an example of game processing executed by the processor 21.

As shown in FIG. 19, if game processing is started, the processor 21 executes an initial process (step S100). Specifically, the processor 21 sets the three-dimensional virtual space and places the static objects (the terrain objects), the player character PC, the plurality of dynamic objects 31, an enemy character EC, and the like in the virtual space.

Next, the processor 21 acquires operation data transmitted from the controllers and stored in the memory (step S101). The operation data includes data relating to operations on the buttons, the analog sticks, and the like of the left and right controllers. Hereinafter, the processor 21 repeatedly executes the processes of steps S101 to S107 at predetermined frame time intervals (e.g., 1/60 second intervals).

Subsequently, based on the operation data, the processor 21 performs a player character action process (step S102). Here, in accordance with an operation input provided by the player, the processor 21 controls the action of the player character PC. Specifically, in step S102, the process of causing the player character PC to start the object operation action, a process during the object operation action, and a process related to another action are performed. The details of the player character action process in step S102 are described below.

(Player Character Action Process)

Figure 20:
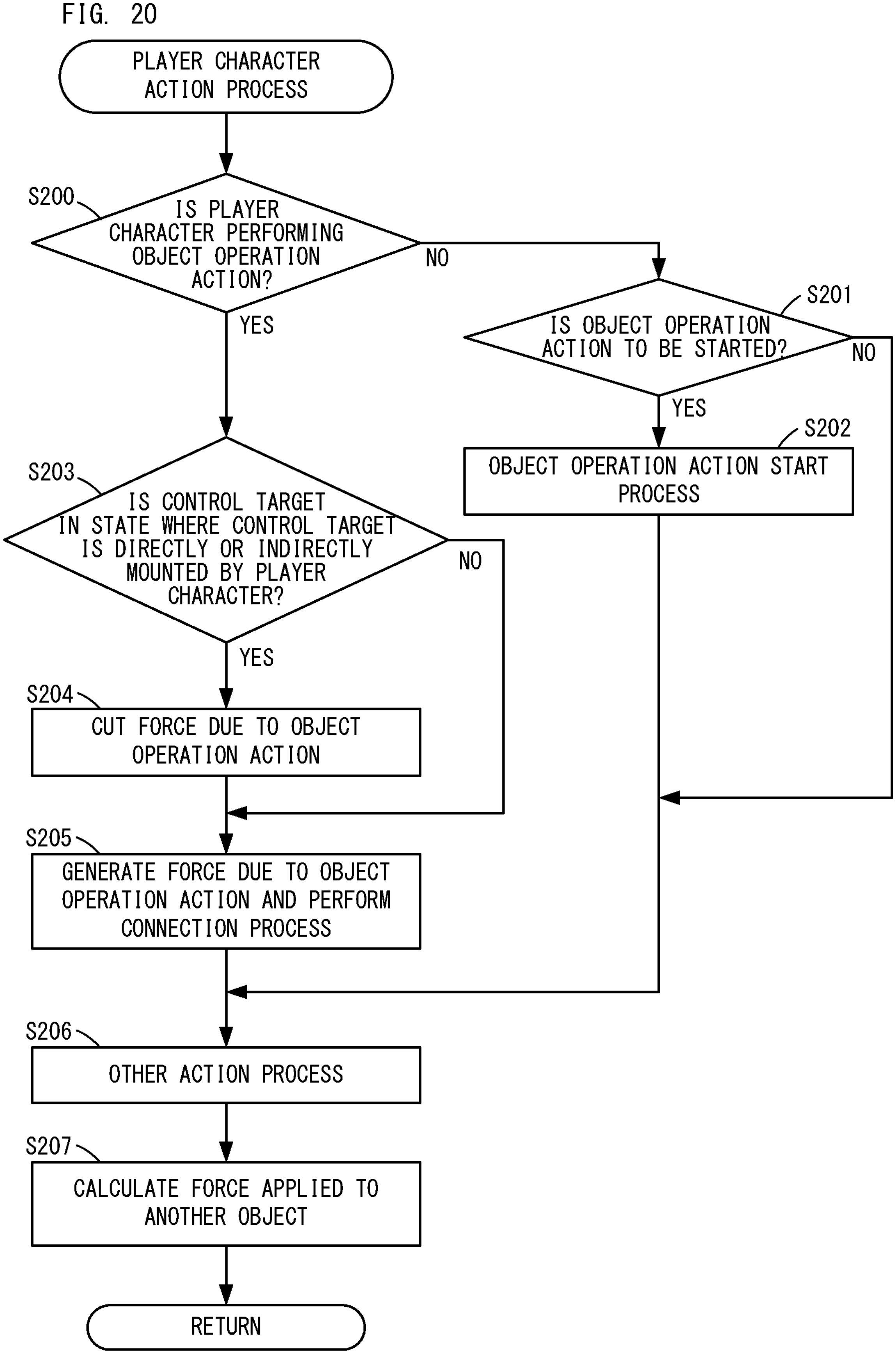
FIG. 20 is an example non-limiting flow chart showing an example of a player character action process in step S102.

FIG. 20 is a flow chart showing an example of the player character action process in step S102.

As shown in FIG. 20, the processor 21 determines whether or not the player character PC is in the state where the player character PC is performing the object operation action (step S200).

If the player character PC is not performing the object operation action (step S200: NO), the processor 21 determines whether or not to start the object operation action (step S201). Specifically, in accordance with a selection operation of the player (e.g., the pressing of the L-button), the processor 21 specifies any of the plurality of dynamic objects 31 (a sole dynamic object or a dynamic object included in an assembly object). In a case where a dynamic object 31 is specified, the processor 21 determines whether or not a predetermined operation input (e.g., the pressing of the A-button) is provided. If the predetermined operation input is provided, the determination of the processor 21 is YES in step S201. In a case where a dynamic object 31 is specified, and if the predetermined operation input is provided, the determination of the processor 21 is YES in step S201 during a predetermined start period (several to several tens of frames).

If it is determined that the object operation action is to be started (step S201: YES), the processor 21 performs an object operation action start process (step S202). Here, the process of causing the player character PC to start the object operation action is performed in accordance with a predetermined operation input provided by the player. Specifically, the processor 21 reproduces a start animation of the object operation action, and updates the animation for a single frame every time the process of step S202 is executed. After the above predetermined start period, the game enters the state where, using the specified dynamic object 31 as a control target, the object operation action on the control target is being performed (the control target is being operated) (see FIG. 4).

If, on the other hand, the player character PC is performing the object operation action (step S200: YES), the processor 21 determines whether or not the control target of the object operation action is in the state where the control target is directly mounted by the player character PC or in the state where the control target is indirectly mounted by the player character PC (step S203). Here, with reference to the state data 133 of the dynamic object data 130, it is determined whether or not the dynamic object 31 as the control target is set to "the state where the dynamic object 31 is mounted by the player character PC" or "the state where the dynamic object 31 is indirectly mounted by the player character PC". The setting of "the state where the dynamic object 31 is mounted by the player character PC" or "the state where the dynamic object 31 is indirectly mounted by the player character PC" will be described below.

If it is determined that the control target is in the state where the control target is directly or indirectly mounted by the player character PC (step S203: YES), the processor 21 makes a setting to cut a force due to the object operation action (step S204). If this process is performed, a force due to the object operation action is not generated in the next step S205.

If step S204 is executed, or if the determination is NO in step S203, based on the operation data, the processor 21 performs the process of generating a "force due to the object operation action" and a connection process (step S205). Here, the process of applying the "force due to the object operation action" to the control target in accordance with an operation input and the process of connecting the control target to another dynamic object in accordance with an operation input are performed. Examples of the "force due to the object operation action" include a force to cause the control target to float in the air, a force to move the control target, and a force to rotate the control target. Specifically, the processor 21 applies a force against gravity to the control target, regardless of the presence or absence of an operation input. By this force against gravity, the control target maintains the state where the control target floats in the air. The processor 21 also applies a force to move the control target in accordance with an operation input. For example, if a direction operation input is provided to the analog stick 6L, the processor 21 applies a force to move the control target in a direction relating to the input direction. For example, if operations on the buttons 5L are performed, the processor 21 applies a force to move the control target or a force to rotate the control target. Based on the "force due to the object operation action" applied here, physical calculations (the process of step S309 described below) are made, whereby the control target moves or rotates in the virtual space in accordance with an operation input. If the process of step S204 is performed, in step S205, a "force due to the object operation action" is not generated.

In step S205, the processor 21 also performs the connection process. Specifically, in a case where the control target and another dynamic object satisfy a predetermined connection condition (e.g., the distance between the control target and the other dynamic object is less than a threshold), and if a connection instruction is given by the player, the processor 21 connects the control target to the other dynamic object. In accordance with the connection instruction, the control target and the other dynamic object come close to each other by pulling each other, and after a predetermined time (e.g., 0.5 seconds), the control target and the other dynamic object are connected together. Consequently, an assembly object is generated. If the control target is connected to the other dynamic object, the object operation action on the control target ends. Even in a case where a "force due to the object operation action" is not generated, but in a case where the connection condition is satisfied, and if a connection instruction is given, the control target is connected to another dynamic object satisfying the connection condition.

If the process of step S205 is performed, or if the process of step S202 is performed, the processor 21 performs an other action process (step S206). Here, in accordance with an operation input, the processor 21 causes the player character PC to perform various actions other than the object operation action. For example, the processor 21 determines whether or not an operation input for an attack action is provided. If the operation input is provided, the processor 21 causes the player character PC to start an attack action. The processor 21 also determines whether or not an operation input for a jump is provided. If the operation input is provided, the processor 21 causes the player character PC to start a jump action in the virtual space. Even when the player character PC is mounting a dynamic object, but if an operation input for a jump is provided, the player character PC performs a jump action and temporarily moves away from the dynamic object.

In step S206, in accordance with an operation input, based on design information saved as the player character data 120, the processor 21 also performs a reconstruction process for causing an assembly object generated by the player in the past to appear in the virtual space. In the reconstruction process, based on the design information, the processor 21 reconstructs the assembly object using a dynamic object placed in the virtual space or a dynamic object saved as the player character data 120 and causes the assembly object to appear in the virtual space. Specifically, a dynamic object placed in the virtual space moves and is incorporated as a part or the entirety of the assembly object. A dynamic object directly or indirectly mounted by the player character PC is not used in the reconstruction of the assembly object and not moved.

Next, the processor 21 calculates a force to be applied to another object (step S207). Here, the processor 21 calculates a force to be applied to a dynamic object in the virtual space by the player character PC (a force other than the above "force due to the object operation action"). For example, if the player character PC is mounting a dynamic object, the gravity of the player character PC is applied to the dynamic object. For example, if the player character PC pushes or attacks a dynamic object, a force is applied to the dynamic object. In step S207, the processor 21 calculates a force to be applied to the dynamic object by the player character PC. Then, the processor 21 ends the process in FIG. 20.

Referring back to FIG. 19, next, the processor 21 performs a dynamic object update process (step S103). Here, the process of making physical calculations based on a force to act on each dynamic object, thereby calculating the velocity and the angular velocity of each dynamic object and updating the position and the orientation of each dynamic object is performed. The details of the dynamic object update process in step S103 are described below.

(Dynamic Object Update Process)

Figure 21:
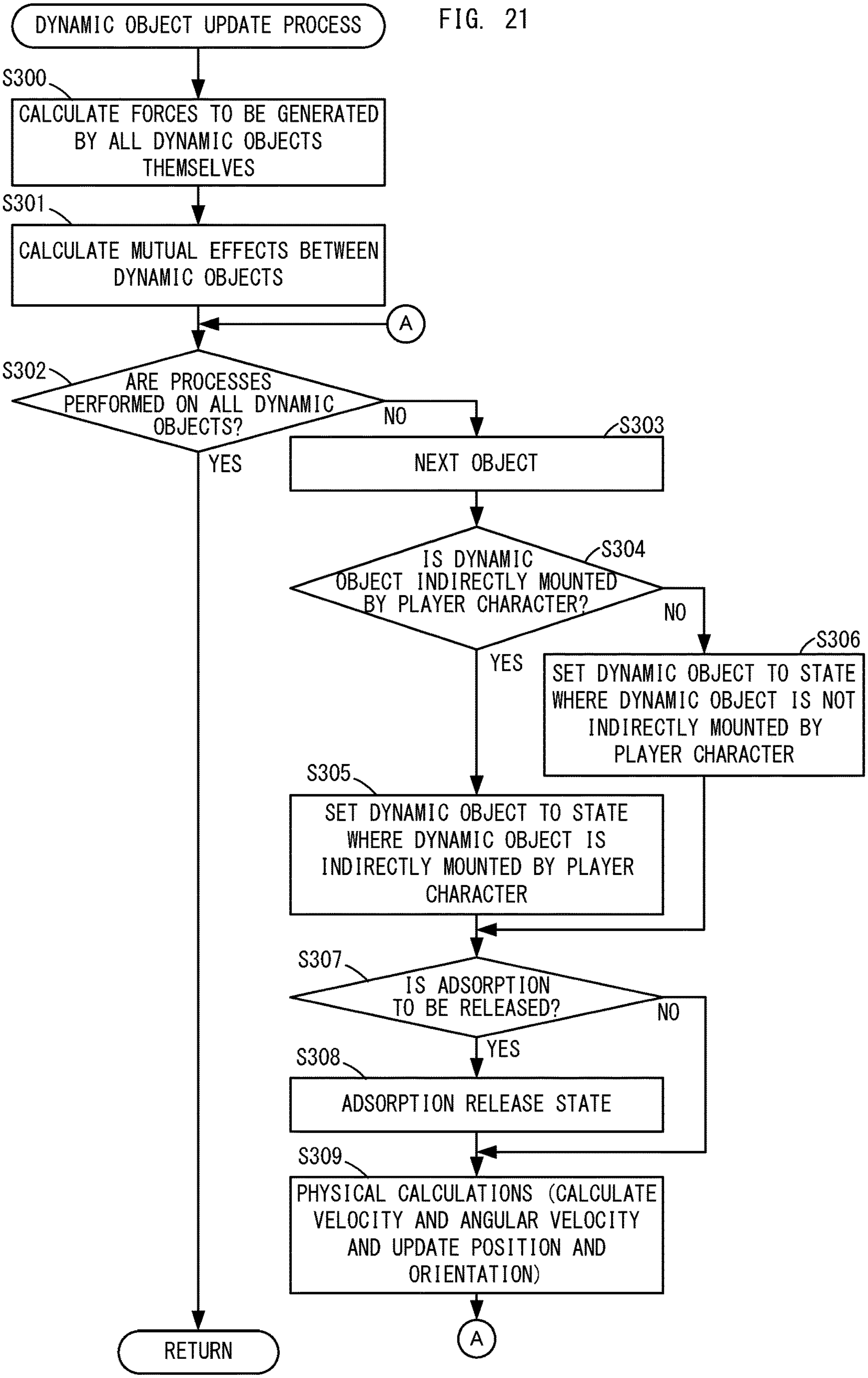
FIG. 21 is an example non-limiting flow chart showing an example of a dynamic object update process in step S103.

FIG. 21 is a flow chart showing an example of the dynamic object update process in step S103.

As shown in FIG. 21, the processor 21 calculates forces to be generated by all the dynamic objects themselves (step S300). As described above, the dynamic objects 31 include an object that generates a force itself and an object that does not generate a force itself. For example, each of the fan object 31*a* and the wheel object 31*b* has a non-operating state and an operating state and generates a propulsive force in the operating state. Each of the first special object 31*c* and the second special object 31*f* has a non-operating state and an operating state and generates a force to perform a predetermined behavior in the operating state. The wing object 31*d* does not have a non-operating state and an operating state, but generates a lift force when moving at a predetermined velocity or more. The processor 21 calculates a force (the propulsive force, the lift force, or the force to perform the predetermined behavior) to be generated by each of all the dynamic objects 31 placed in the virtual space.

Next, the processor 21 calculates mutual effects between dynamic objects in all the dynamic objects 31 placed in the virtual space (step S301). Here, the processor 21 calculates forces between dynamic objects in contact with each other. Specifically, the processor 21 determines whether or not a certain dynamic object is in contact with another dynamic object. If a certain dynamic object is in contact with another dynamic object, the processor 21 calculates forces to act between these dynamic objects. The processor 21 also calculates a force to be applied based on the action of the player character PC. For example, the processor 21 applies the “force due to the object operation action” generated in the above step S205 to the dynamic object as the control target of the object operation action.

Next, the processor 21 determines whether or not the processes of steps S303 to S309 shown below are performed on all the dynamic objects placed in the virtual space in the current process in FIG. 21 (step S302).

If the determination is NO in step S302, the processor 21 selects as a processing target a dynamic object that has not yet been subjected to the processes (step S303).

Next, the processor 21 determines whether or not the dynamic object as the processing target is indirectly mounted by the player character PC (step S304). Specifically, based on the result of the process of the above step S301, the processor 21 determines whether or not the dynamic object as the processing target is supporting the player character PC. In the above steps S207 and S301, the forces to be applied to each dynamic object are calculated. Thus, the processor 21 can determine whether or not the dynamic object as the processing target is supporting a dynamic object that the player character PC is mounting. If the dynamic object as the processing target is supporting a dynamic object that the player character PC is mounting, the determination of the processor 21 is YES in step S304. For example, if the dynamic object as the processing target is a part of an assembly object and the assembly object includes a dynamic object that the player character PC is mounting (case 1 or 2), the determination of the processor 21 is YES in step S304. If a dynamic object mounted by the player character PC is on and in contact with the dynamic object as the processing target (case 3), the determination of the processor 21 is YES in step S304. In a case where the dynamic object as the processing target is a part of an assembly object, and if a dynamic object mounted by the player character PC is on and in contact with another dynamic object included in the assembly object (case 4), the determination of the processor 21 is YES in step S304. If an assembly object including a dynamic object mounted by the player character PC is on and in contact with the dynamic object as the processing target (case 5 or case 6), the determination of the processor 21 is YES in step S304. If a dynamic object indirectly mounted by the player character PC is on and in contact with the dynamic object as the processing target (case 7), the determination of the processor 21 is YES in step S304. If the dynamic object as the processing target is a dynamic object directly mounted by the player character PC, the determination of the processor 21 is NO in step S304.

If it is determined that the dynamic object as the processing target is indirectly mounted by the player character PC (step S304: YES), the processor 21 sets the dynamic object as the processing target to “the state where the dynamic object is indirectly mounted by the player character PC” (step S305). Specifically, the processor 21 sets a value indicating “the state where the dynamic object is indirectly mounted by the player character PC” in the state data 133 of the dynamic object as the processing target.

If it is determined that the dynamic object as the processing target is not indirectly mounted by the player character PC (step S304: NO), the processor 21 sets a value indicating “the state where the dynamic object is not indirectly mounted by the player character PC” in the state data 133 of the dynamic object as the processing target (step S306). If the dynamic object as the processing target is directly mounted by the player character PC, the processor 21 maintains the state data 133 of the dynamic object as the processing target in step S306. That is, if the player character PC is mounting the dynamic object as the processing target, the value indicating “the state where the dynamic object is mounted by the player character PC” is set in the state data 133 (step S409 described below), and therefore, this value is maintained.

If the process of step S305 is performed, or if the process of step S306 is performed, the processor 21 determines whether or not to release adsorption (step S307). Specifically, the processor 21 determines whether or not the dynamic object as the processing target is a part of an assembly object including the first special object 31*c* or the first special object 31*c*, and the current moment is during the second period when the first special object 31*c* is performing the predetermined behavior. Further, based on the angular velocity of the first special object 31*c*, the processor 21 may determine whether or not to release the adsorption. For example, based on whether or not the angular velocity of the first special object 31*c* exceeds a threshold, the processor 21 may determine whether or not to release the adsorption. In a case where the dynamic object as the processing target is the second special object 31*f*, the processor 21 determines whether or not the current moment is during the second period when the second special object 31*f* is performing the predetermined behavior. The condition for determining whether or not to release the adsorption is not limited to this, and may be another condition.

If it is determined that the adsorption is to be released (step S307: YES), the processor 21 sets the dynamic object as the processing target to the adsorption release state (step S308). Specifically, the processor 21 stores a value indicating that the dynamic object as the processing target is in the adsorption release state in the state data 133 of the dynamic object as the processing target.

If the process of step S308 is performed, or if the determination is NO in step S307, the processor 21 makes physical calculations on the dynamic object as the processing target, thereby updating the velocity, the angular velocity, the position, the orientation, and the like of the dynamic object (step S309). Here, the physical calculations are made based on the forces to be applied to the dynamic object as the processing target (the forces calculated in steps S207, S300, and S301) and the current velocity, angular velocity, position, orientation, and the like of the dynamic object, thereby calculating the latest velocity, angular velocity, position, orientation, and the like of the dynamic object. The calculated latest values are stored as the position/orientation data 131 and the velocity/angular velocity data 132.

If the process of step S309 is performed, the processor 21 executes the process of step S302 again.

If, on the other hand, the determination is YES in step S302, the processor 21 ends the process shown in FIG. 21.

Referring back to FIG. 19, next, the processor 21 performs a player character update process (step S104). Here, the process of updating the position and the orientation of the player character PC is performed. The details of the player character update process in step S104 are described below.

(Player Character Update Process)

Figure 22:
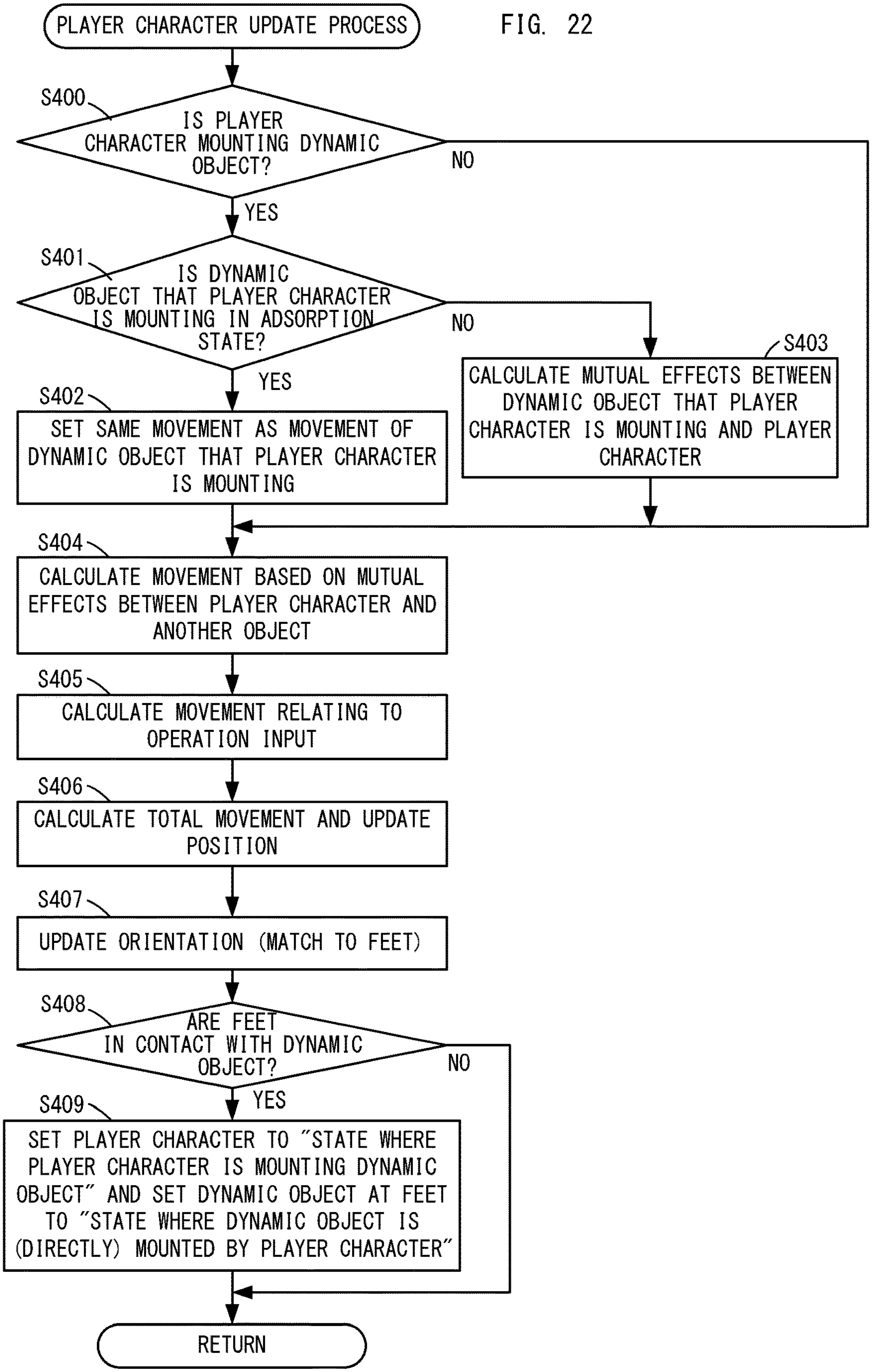
FIG. 22 is an example non-limiting flow chart showing an example of a player character update process in step S104.

FIG. 22 is a flow chart showing an example of the player character update process in step S104.

As shown in FIG. 22, the processor 21 determines whether or not the player character PC is mounting a dynamic object (step S400). In the state data 123 of the player character data 120, a value indicating whether or not the player character PC is in "the state where the player character PC is mounting a dynamic object" is set. Thus, the processor 21 makes the determination in step S400 based on this data.

If the player character PC is mounting a dynamic object (step S400: YES), the processor 21 determines whether or not the dynamic object that the player character PC is mounting is in the adsorption state (step S401).

If the dynamic object that the player character PC is mounting is in the adsorption state (step S401: YES), the processor 21 sets the same movement as the movement of the dynamic object that the player character PC is mounting (step S402). Specifically, the processor 21 sets in the memory the movement (the amount of movement and the moving direction) of the dynamic object that the player character PC is mounting in a single frame. In the above step S309, the latest position and velocity of each dynamic object are calculated. For example, based on the latest position and the position in the immediately preceding frame of the dynamic object that the player character PC is mounting, the processor 21 calculates the movement of the dynamic object in a single frame. Based on the latest velocity of the dynamic object that the player character PC is mounting, the processor 21 may calculate the movement of the dynamic object in a single frame. The processor 21 may set the movement of the contact position of the dynamic object that the player character PC is mounting (the positions of the feet of the player character PC) as the movement of the dynamic object.

If, on the other hand, the dynamic object that the player character PC is mounting is not in the adsorption state (step S401: NO), the processor 21 calculates mutual effects between the dynamic object that the player character PC is mounting and the player character PC (step S403). Specifically, the processor 21 calculates a force to be received by the player character PC from the dynamic object that the player character PC is mounting.

If the process of step S402 is performed, or if the process of step S403 is performed, the processor 21 calculates a movement based on mutual effects between the player character PC and another object (step S404). Specifically, the processor 21 calculates all forces to be received by the player character PC except for the force from the dynamic object that the player character PC is mounting. For example, the processor 21 determines whether or not the player character PC is in contact with a dynamic object other than the dynamic object that the player character PC is mounting. If the player character PC is in contact with a dynamic object other than the dynamic object that the player character PC is mounting, the processor 21 calculates a force from the dynamic object with which the player character PC is in contact. The processor 21 also determines whether or not the player character PC is attacked by an enemy character. If the player character PC is attacked by an enemy character, the processor 21 calculates a force relating to the attack. Then, if step S404 is executed after step S402, the processor 21 makes physical calculations based on all forces to be received by the player character PC except for the force from the dynamic object that the player character PC is mounting. If step S404 is executed after step S403, the processor 21 makes physical calculations based on all forces to be received by the player character PC, including the force from the dynamic object that the player character PC is mounting that is calculated in step S403. As the results of the physical calculations, the velocity and the angular velocity of the player character PC based on "the mutual effects between the player character PC and the other object" are calculated, and "the movement based on the mutual effects between the player character PC and the other object" is calculated.

Next, the processor 21 calculates a movement relating to an operation input (step S405). Here, in a case where the player character PC is mounting the ground or a dynamic object, and if a direction operation input is provided to the analog stick 6L, a movement (the amount of movement and the moving direction) relating to the direction operation input is calculated. Here, in accordance with the input amount of the direction operation input, the tilt or the friction of the ground or the dynamic object that the player character PC is mounting, and the like, the amount of movement and the moving direction to be calculated differ. For example, if the player character PC moves on a ground having great friction or a ground having great tilt, the amount of movement to be calculated is small.

Next, the processor 21 calculates the total movement of the player character PC and updates the position in the virtual space of the player character PC (step S406). Here, based on the result of the above step S402, the result of the above step S404, and the result of the above step S405, the processor 21 calculates the total movement of the player character PC. Specifically, if the dynamic object that the player character PC is mounting is in the adsorption state, the processor 21 adds the movement calculated in step S404 and further adds the movement calculated in step S405 to the movement set in step S402. Consequently, if the dynamic object that the player character PC is mounting is in the adsorption state, the movement of the dynamic object that the player character PC is mounting is applied to the player character PC. Further, in a case where the player character PC is in contact with another object, a movement relating to mutual effects between the player character PC and the other object is added, and if an operation input is provided, a movement relating to the operation input is added. If, on the other hand, the dynamic object that the player character PC is mounting is in the adsorption release state, a movement based on mutual effects between the player character PC and the dynamic object that the player character PC is mounting is calculated. Further, if the player character PC is in contact with another object, a movement relating to mutual effects between the player character PC and the other object is added. If an operation input is provided, a movement relating to the operation input is added. If the player character PC is not mounting a dynamic object, the movement calculated in step S405 is added to the movement calculated in step S404. Then, based on the calculated total movement, the processor 21 updates the position of the player character PC and saves the updated position as the position/orientation data 121. The processor 21 also updates the velocity of the player character PC and saves the updated velocity as the velocity/angular velocity data 122.

Next, the processor 21 updates the orientation of the player character PC (step S407). Specifically, based on the result of step S404, the processor 21 updates the orientation of the player character PC. If the player character PC is mounting a dynamic object, the processor 21 sets the orientation of the player character PC so that the player character PC is not tilted with respect to an axis in the up-down direction in the virtual space (or the tilt of the player character PC with respect to the axis in the up-down direction is in a predetermined range). The processor 21 matches the orientations of the feet of the player character PC to the object at the feet.

Next, the processor 21 determines whether or not the feet of the player character PC are in contact with a dynamic object (step S408). Here, it is determined whether or not a dynamic object is in contact with the player character PC in the down direction of the player character PC.

If it is determined that the feet of the player character PC are in contact with a dynamic object (step S408: YES), the processor 21 sets the player character PC to "the state where the player character PC is mounting a dynamic object" (step S409). The processor 21 also sets the dynamic object with which the feet of the player character PC are in contact to "the state where the dynamic object is (directly) mounted by the player character PC".

If the process of step S409 is executed, or if the determination is NO in step S408, the processor 21 ends the process shown in FIG. 22.

Referring back to FIG. 19, next, the processor 21 performs an NPC update process (step S105). The NPC update process is the process of updating the positions and the orientations of an enemy character and other non-player characters (referred to as "NPCs"). In the NPC update process, not in accordance with an operation input provided by the player but based on a predetermined algorithm, the processor 21 moves an NPC or causes an NPC to perform an attack action. In the NPC update process, a process similar to the process of the above step S104 is performed. In the NPC update process, basically, the processor 21 performs a process similar to the player character update process, but calculates the movement of an NPC based on a predetermined algorithm instead of calculating a movement relating to an operation input in the above step S405. That is, in a case where an NPC is mounting a dynamic object, and if the dynamic object is in the adsorption state, the movement of the NPC is added to the movement of the dynamic object.

Next, the processor 21 performs a drawing process (step S106). Here, an image of the virtual space viewed from the virtual camera placed in the virtual space is generated. Consequently, a game image relating to the processes of steps S101 to S105 is generated. The generated game image is output to the display 12 or another display device. The drawing process in step S106 is repeatedly executed at predetermined frame time intervals, whereby the state where the player character PC moves in the virtual space and the state where the player character PC performs various actions are displayed.

Next, the processor 21 determines whether or not to end the game (step S107). For example, if the player gives an instruction to end the game, the processor 21 determines that the game is to be ended. Then, the processor 21 ends the game processing shown in FIG. 19. If, on the other hand, the determination is NO in step S107, the processor 21 executes the process of step S101 again.

As described above, in the game according to the above exemplary embodiment, a dynamic object placed in the virtual space is moved in a virtual space based on physical calculations (S309). A player character is moved based on an operation input (S405), and a contact determination regarding the down direction of the player character is made (S408). If the player character and the dynamic object are in contact with each other in the down direction, the process of adding the movement of the dynamic object in contact with the player character in the down direction to the movement of the player character is performed (S406).

Consequently, it is possible to move the player character with the dynamic object that the player character PC is mounting in the virtual space, and also move the player character on the dynamic object.

In the above exemplary embodiment, the player character is moved based on physical calculations associated with contact between a dynamic object that the player character is not mounting and the player character (S404 and S406). The player character is not moved based on physical calculations associated with contact with a dynamic object that the player character is mounting, and the movement of the dynamic object that the player character PC is mounting is applied to the player character (S402). Consequently, it is possible to move the player character with the dynamic object that the player character PC is mounting in the virtual space, and if the player character PC is in contact with another dynamic object that the player character is not mounting, it is possible to move the player character based on physical calculations. For example, if another dynamic object that the player character is not mounting collides with the player character, it is possible to further move the player character.

In the above exemplary embodiment, in a case where an assembly object includes a special object, and if the player character is on a dynamic object included in the assembly object, during a predetermined period when the special object is performing an action, the process of adding the movement of the dynamic object to the movement of the player character is not performed, and the player character is moved based on physical calculations associated with contact between the dynamic object and the player character (S403, S404, or S406). Consequently, for example, it is possible to move the player character away from the dynamic object that the player character PC is mounting in the middle of the action of the assembly object.

In the above exemplary embodiment, based on an operation input provided by a player, the player character is caused to perform an object operation action including a first operation of moving a specified dynamic object, and a second operation of forming an assembly object by linking the specified dynamic object to another dynamic object. If the assembly object including the dynamic object specified based on the object operation action includes a dynamic object that the player character is mounting, the assembly object is not moved based on the object operation action (S204). Consequently, it is possible to prevent an assembly object from continuing to move based on the object operation action, and it is possible to make it easy to operate a control target based on the object operation action.

(Variations)

While the exemplary embodiment has been described above, the exemplary embodiment is merely an example and may be modified as follows, for example.

For example, the processes shown in the above flow charts are merely illustrative, and the order and the contents of the processes, and the like may be appropriately changed. For example, in the above exemplary embodiment, in the player character update process, the processes are performed in the order of steps S402, S404, and S405. This order, however, may be optionally changed. In the above exemplary embodiment, after the physical calculations regarding the dynamic objects are made, the physical calculations regarding the player character and the NPCs are made. In another exemplary embodiment, physical calculations may be simultaneously made regarding all the objects (the dynamic objects, the player character, and the NPCs).

In the above exemplary embodiment, if the player character PC is mounting a dynamic object, the movement of the dynamic object is added to the movement of the player character PC, and the orientation of the player character PC is maintained as a certain orientation. That is, in the above exemplary embodiment, the movement of the dynamic object is added to the movement of the player character PC, but the orientation of the player character PC is adjusted so that the player character PC is not tilted with respect to the axis in the up-down direction in the virtual space or is in the predetermined range. In another exemplary embodiment, if the player character PC is mounting a dynamic object, the movement of the dynamic object may be added to the movement of the player character PC, and a change in the orientation of the dynamic object may be applied to the player character PC. In this case, if the dynamic object that the player character PC is mounting is tilted, the player character PC is also similarly tilted.

In the above exemplary embodiment, when the player character PC is on and in contact with a dynamic object, and if the player character PC jumps, the player character PC temporarily moves away from the dynamic object, and during this period, the movement of the dynamic object is not applied to the player character PC. In another exemplary embodiment, even when the player character PC jumps on a dynamic object and is temporarily away from the dynamic object, the movement of the dynamic object may be applied to the player character PC. That is, such a state where the player character PC is temporarily away from the dynamic object may be regarded as the state where the player character is mounting the dynamic object (the adsorption state may be maintained), and the movement of the dynamic object may be applied to the player character.

In the above exemplary embodiment, based on the object operation action of the player character PC, the first operation of moving a control target in the virtual space, and the second operation of connecting (linking) the control target to another dynamic object are performed. In another exemplary embodiment, based on the object operation action, only the first operation of moving a control target may be performed. In this case, the process of generating an assembly object by connecting a dynamic object to another dynamic object may be performed based on another action on the player character. An assembly object may be generated not based on the action of the player character, but based on an operation of the player. An assembly object may not be generated based on an operation of the player, and may be prepared in advance.

In the above exemplary embodiment, any one of dynamic objects included in an assembly object is specified and set as a control target of the object operation action. In another exemplary embodiment, the entirety of an assembly object may be specified, and the entirety of the assembly object may be set as a control target of the object operation action. A plurality of dynamic objects included in an assembly object may be specified, and the plurality of dynamic objects may be set as a control target of the object operation action.

In the above exemplary embodiment, a dynamic object connected to the first special object and the second special object are changed from the adsorption state to the adsorption release state in the operating state. In another exemplary embodiment, regardless of whether or not such a special object is connected to a dynamic object, the dynamic object may be brought into the adsorption state until a predetermined condition is satisfied. Then, if the predetermined condition is satisfied, the dynamic object may be brought into the adsorption release state. The predetermined condition may be a condition regarding the time after the dynamic object enters the operating state, or may be a condition regarding the velocity, the angular velocity, the position, the orientation, or the like of the dynamic object, or may be a condition obtained by combining the time after the dynamic object enters the operating state, the velocity, the angular velocity, the position, the orientation, and the like of the dynamic object.

The configuration of the hardware that performs the above game processing is merely an example, and the above game processing may be performed by any other hardware. For example, the above game processing may be executed by any information processing system such as a personal computer, a tablet terminal, a smartphone, or a server on the Internet. The above game processing may also be executed in a dispersed manner by a plurality of apparatuses.

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. One or more non-transitory computer-readable media having stored therein instructions that, when executed, cause one or more processors of an information processing apparatus to execute game processing comprising:

controlling movements of a player character and a movable dynamic object placed in a virtual space, through control based on an operation input to the player character and control based on physical calculations including an interaction between the player character and the dynamic object;

making a contact determination regarding a down direction of the player character; and if the player character is in contact with the dynamic object in the down direction, adding the movement of the dynamic object in contact with the player character in the down direction to the movement of the player character, instead of the interaction from the dynamic object in contact with the player character in the down direction.

2. The one or more non-transitory computer-readable media according to claim 1, wherein the game processing further comprises forming an assembly object by linking a plurality of the dynamic objects based on an operation input.

3. The one or more non-transitory computer-readable media according to claim 2, wherein the dynamic object includes a propulsive object that has an operating state and a non-operating state and generates a propulsive force in the operating state, and the game processing further comprises, if the assembly object includes the propulsive object in the operating state, controlling a movement of the assembly object based on the propulsive force.

4. The one or more non-transitory computer-readable media according to claim 2, wherein the dynamic object includes a special behavior object that has a first state and a second state and makes a predetermined motion in accordance with a change from the first state to the second state, and the game processing further comprises, if the assembly object includes the special behavior object, during a predetermined period when the special behavior object is making the predetermined motion, not performing a process of adding the movement of the dynamic object included in the assembly object and in contact with the player character in the down direction to the movement of the player character, and performing a process of adding a second movement of the player character calculated based on physical calculations associated with contact between the dynamic object in contact with the player character in the down direction and the player character to the movement of the player character.

5. The one or more non-transitory computer-readable media according to claim 1, wherein the dynamic object includes a special behavior object that has a first state and a second state and makes a predetermined motion in accordance with a change from the first state to the second state, and the game processing further comprises, if the dynamic object in contact with the player character in the down direction is the special behavior object, during a predetermined period when the special behavior object is making the predetermined motion, not performing a process of adding the movement of the dynamic object in contact with the player character in the down direction to the movement of the player character, and performing a process of adding a second movement of the player character calculated based on physical calculations associated with contact between the dynamic object in contact with the player character in the down direction and the player character to the movement of the player character.

6. The one or more non-transitory computer-readable media according to claim 2, wherein the game processing further comprises:

based on an operation input, causing the player character to perform an object operation action at least including a first operation of moving a specified dynamic object and a second operation of forming an assembly object by linking the specified dynamic object to the other dynamic object; and if the assembly object including the dynamic object specified based on the object operation action includes the dynamic object in contact with the player character in the down direction, controlling the dynamic object not to move based on the first operation.

7. The one or more non-transitory computer-readable media according to claim 6, wherein the game processing further comprises, if the dynamic object in contact with the player character in the down direction is mounting the dynamic object specified based on the object operation action or the assembly object including the dynamic object specified based on the object operation action, controlling the dynamic object not to move based on the first operation.

8. An information processing system comprising:

a memory and one or more processors configured to cooperate to execute game processing comprising:

controlling movements of a player character and a movable dynamic object placed in a virtual space, through control based on an operation input to the player character and control based on physical calculations including an interaction between the player character and the dynamic object;

making a contact determination regarding a down direction of the player character; and if the player character is in contact with the dynamic object in the down direction, adding the movement of the dynamic object in contact with the player character in the down direction to the movement of the player character, instead of the interaction from the dynamic object in contact with the player character in the down direction.

9. The information processing system according to claim 8, wherein the game processing further comprises forming an assembly object by linking a plurality of the dynamic objects based on an operation input.

10. The information processing system according to claim 9, wherein the dynamic object includes a propulsive object that has an operating state and a non-operating state and generates a propulsive force in the operating state, and the game processing further comprises, if the assembly object includes the propulsive object in the operating state, controlling a movement of the assembly object based on the propulsive force.

11. The information processing system according to claim 9, wherein the dynamic object includes a special behavior object that has a first state and a second state and makes a predetermined motion in accordance with a change from the first state to the second state, and the game processing further comprises, if the assembly object includes the special behavior object, during a predetermined period when the special behavior object is making the predetermined motion, not performing a process of adding the movement of the dynamic object included in the assembly object and in contact with the player character in the down direction to the movement of the player character, and performing a process of adding a second movement of the player character calculated based on physical calculations associated with contact between the dynamic object in contact with the player character in the down direction and the player character to the movement of the player character.

12. The information processing system according to claim 8, wherein the dynamic object includes a special behavior object that has a first state and a second state and makes a predetermined motion in accordance with a change from the first state to the second state, and the game processing further comprises, if the dynamic object in contact with the player character in the down direction is the special behavior object, during a predetermined period when the special behavior object is making the predetermined motion, not performing a process of adding the movement of the dynamic object in contact with the player character in the down direction to the movement of the player character, and performing a process of adding a second movement of the player character calculated based on physical calculations associated with contact between the dynamic object in contact with the player character in the down direction and the player character to the movement of the player character.

13. The information processing system according to claim 9, wherein the game processing further comprises:

based on an operation input, causing the player character to perform an object operation action at least including a first operation of moving a specified dynamic object and a second operation of forming an assembly object by linking the specified dynamic object to the other dynamic object; and if the assembly object including the dynamic object specified based on the object operation action includes the dynamic object in contact with the player character in the down direction, controlling the dynamic object not to move based on the first operation.

14. The information processing system according to claim 13, wherein the game processing further comprises, if the dynamic object in contact with the player character in the down direction is mounting the dynamic object specified based on the object operation action or the assembly object including the dynamic object specified based on the object operation action, controlling the dynamic object not to move based on the first operation.

15. An information processing apparatus comprising:

a memory storing instructions; and one or more processors configured to execute the instructions to perform game processing comprising:

controlling movements of a player character and a movable dynamic object placed in a virtual space, through control based on an operation input to the player character and control based on physical calculations including an interaction between the player character and the dynamic object;

making a contact determination regarding a down direction of the player character; and if the player character is in contact with the dynamic object in the down direction, adding the movement of the dynamic object in contact with the player character in the down direction to the movement of the player character, instead of the interaction from the dynamic object in contact with the player character in the down direction.

16. The information processing apparatus according to claim 15, wherein the game processing further comprises forming an assembly object by linking a plurality of the dynamic objects based on an operation input.

17. The information processing apparatus according to claim 16, wherein the dynamic object includes a propulsive object that has an operating state and a non-operating state and generates a propulsive force in the operating state, and the game processing further comprises, if the assembly object includes the propulsive object in the operating state, controlling a movement of the assembly object based on the propulsive force.

18. The information processing apparatus according to claim 16, wherein the dynamic object includes a special behavior object that has a first state and a second state and makes a predetermined motion in accordance with a change from the first state to the second state, and the game processing further comprises, if the assembly object includes the special behavior object, during a predetermined period when the special behavior object is making the predetermined motion, not performing a process of adding the movement of the dynamic object included in the assembly object and in contact with the player character in the down direction to the movement of the player character, and performing a process of adding a second movement of the player character calculated based on physical calculations associated with contact between the dynamic object in contact with the player character in the down direction and the player character to the movement of the player character.

19. The information processing apparatus according to claim 15, wherein the dynamic object includes a special behavior object that has a first state and a second state and makes a predetermined motion in accordance with a change from the first state to the second state, and the game processing further comprises, if the dynamic object in contact with the player character in the down direction is the special behavior object, during a predetermined period when the special behavior object is making the predetermined motion, not performing a process of adding the movement of the dynamic object in contact with the player character in the down direction to the movement of the player character, and performing a process of adding a second movement of the player character calculated based on physical calculations associated with contact between the dynamic object in contact with the player character in the down direction and the player character to the movement of the player character.

20. The information processing apparatus according to claim 16, wherein the game processing further comprises:

based on an operation input, causing the player character to perform an object operation action at least including a first operation of moving a specified dynamic object and a second operation of forming an assembly object by linking the specified dynamic object to the other dynamic object; and if the assembly object including the dynamic object specified based on the object operation action includes the dynamic object in contact with the player character in the down direction, controlling the dynamic object not to move based on the first operation.

21. The information processing apparatus according to claim 20, wherein the game processing further comprises, if the dynamic object in contact with the player character in the down direction is mounting the dynamic object specified based on the object operation action or the assembly object including the dynamic object specified based on the object operation action, controlling the dynamic object not to move based on the first operation.

22. An information processing method executed by an information processing system, the information processing method comprising:

controlling movements of a player character and a movable dynamic object placed in a virtual space, through control based on an operation input to the player character and control based on physical calculations including an interaction between the player character and the dynamic object;

making a contact determination regarding a down direction of the player character; and if the player character is in contact with the dynamic object in the down direction, adding the movement of the dynamic object in contact with the player character in the down direction to the movement of the player character, instead of the interaction from the dynamic object in contact with the player character in the down direction.

23. The information processing method according to claim 22, further comprising forming an assembly object by linking a plurality of the dynamic objects based on an operation input.

24. The information processing method according to claim 23, wherein the dynamic object includes a propulsive object that has an operating state and a non-operating state and generates a propulsive force in the operating state, and the information processing method further comprises, if the assembly object includes the propulsive object in the operating state, controlling a movement of the assembly object based on the propulsive force.

25. The information processing method according to claim 23, wherein the dynamic object includes a special behavior object that has a first state and a second state and makes a predetermined motion in accordance with a change from the first state to the second state, and the information processing method further comprises, if the assembly object includes the special behavior object, during a predetermined period when the special behavior object is making the predetermined motion, not performing a process of adding the movement of the dynamic object included in the assembly object and in contact with the player character in the down direction to the movement of the player character, and performing a process of adding a second movement of the player character calculated based on physical calculations associated with contact between the dynamic object in contact with the player character in the down direction and the player character to the movement of the player character.

26. The information processing method according to claim 22, wherein the dynamic object includes a special behavior object that has a first state and a second state and makes a predetermined motion in accordance with a change from the first state to the second state, and the information processing method further comprises, if the dynamic object in contact with the player character in the down direction is the special behavior object, during a predetermined period when the special behavior object is making the predetermined motion, not performing a process of adding the movement of the dynamic object in contact with the player character in the down direction to the movement of the player character, and performing a process of adding a second movement of the player character calculated based on physical calculations associated with contact between the dynamic object in contact with the player character in the down direction and the player character to the movement of the player character.

27. The information processing method according to claim 23, further comprising:

based on an operation input, causing the player character to perform an object operation action at least including a first operation of moving a specified dynamic object and a second operation of forming an assembly object by linking the specified dynamic object to the other dynamic object; and if the assembly object including the dynamic object specified based on the object operation action includes the dynamic object in contact with the player character in the down direction, controlling the dynamic object not to move based on the first operation.

28. The information processing method according to claim 27, further comprising if the dynamic object in contact with the player character in the down direction is mounting the dynamic object specified based on the object operation action or the assembly object including the dynamic object specified based on the object operation action, controlling the dynamic object not to move based on the first operation.

* * * * *